US011002466B2

(12) United States Patent
Tsuda et al.

(10) Patent No.: US 11,002,466 B2
(45) Date of Patent: May 11, 2021

(54) ABSORBER COATING FOR SOLAR HEAT POWER GENERATION AND MANUFACTURING METHOD THEREOF

(71) Applicant: NANO FRONTIER TECHNOLOGY CO., LTD., Tokyo (JP)

(72) Inventors: Kaoru Tsuda, Tokyo (JP); Yasushi Murakami, Ueda (JP)

(73) Assignee: NANO FRONTIER TECHNOLOGY CO., LTD.

( * ) Notice: Subject to any disclaimer, the term of this patent is extended or adjusted under 35 U.S.C. 154(b) by 13 days.

(21) Appl. No.: 16/477,954

(22) PCT Filed: Sep. 25, 2017

(86) PCT No.: PCT/JP2017/034545
§ 371 (c)(1),
(2) Date: Jul. 15, 2019

(87) PCT Pub. No.: WO2018/138965
PCT Pub. Date: Aug. 2, 2018

(65) Prior Publication Data
US 2019/0368781 A1 Dec. 5, 2019

(30) Foreign Application Priority Data

Jan. 24, 2017 (JP) .............................. JP2017-010110

(51) Int. Cl.
*B32B 5/16* (2006.01)
*F24S 70/20* (2018.01)
(Continued)

(52) U.S. Cl.
CPC .............. *F24S 70/20* (2018.05); *C09K 5/14* (2013.01); *F24S 70/25* (2018.05); *F24S 70/30* (2018.05); *Y02E 10/40* (2013.01)

(58) Field of Classification Search
CPC .......... F24S 70/12; F24S 70/25; F24S 70/225; F24S 2023/86; Y02E 10/40
See application file for complete search history.

(56) References Cited

U.S. PATENT DOCUMENTS 3,496,011 A 2/1970 Crosby et al.
4,268,319 A 5/1981 Muenker et al.
(Continued)

FOREIGN PATENT DOCUMENTS

EP 2341038 A1 7/2011
GB 2082316 A 3/1982
(Continued)

OTHER PUBLICATIONS

Fukuda et al., Highly active and selective Ti-incorporated porous silica catalysts derived from grafting of titanium(IV) acetylacetonate, J. Mater. Chem. A, 2015, 3, 15280-15291 (Year: 2015).*
(Continued)

*Primary Examiner* — Hoa (Holly) Le
(74) *Attorney, Agent, or Firm* — Harness, Dickey & Pierce, P.L.C.

(57) ABSTRACT

An absorber coating is provided for solar heat power generation that has excellent thermal oxidation resistance and a high spectral absorptance and manufacturing method thereof. The absorber coating for solar heat power generation has a network structure of composite particles comprising: particles of metal oxide containing mainly two or more metals selected from Mn, Cr, Cu, Zr, Mo, Fe, Co and Bi, and titanium oxide partly or entirely coating on the surface of the particle of the metal oxide. The arithmetic mean estimation of the surface of the coating is 1.0 μm or more, and a ratio of a network area of the composite particle to a plane area of the coating is 7 or more.

16 Claims, 26 Drawing Sheets

(51) Int. Cl.
*F24S 70/25* (2018.01)
*F24S 70/30* (2018.01)
*C09K 5/14* (2006.01)

(56) References Cited

U.S. PATENT DOCUMENTS

| | | | | |
|---|---|---|---|---|
| 4,735,861 | A | * | 4/1988 | Carlson .................. C03C 17/25 427/166 |
| 5,693,134 | A | * | 12/1997 | Stephens ................. C08K 9/02 106/415 |
| 5,776,556 | A | | 7/1998 | Lazarov et al. |
| 2004/0161614 | A1 | * | 8/2004 | Athey .................... C03C 17/23 428/432 |
| 2005/0189525 | A1 | * | 9/2005 | Kuckelkorn ........ C23C 28/3455 252/582 |
| 2012/0180783 | A1 | | 7/2012 | Kruger et al. |
| 2016/0010896 | A1 | | 1/2016 | Chandra et al. |

FOREIGN PATENT DOCUMENTS

| | | |
|---|---|---|
| IT | BA20110036 A1 | 12/2012 |
| JP | S58-43361 A | 3/1983 |
| JP | H09-507095 A | 7/1997 |
| JP | 2006-001820 A | 1/2006 |
| JP | 2012-201589 A | 10/2012 |
| JP | 2015-148205 A | 8/2015 |
| WO | WO-2012-131833 A1 | 10/2012 |
| WO | 2015-138990 A1 | 9/2015 |

OTHER PUBLICATIONS

Schmidt & Park, High-Temperature Space-Stable Selective Solar Absorber Coatings, Applied Optics, vol. 4, No. 8, Aug. 1965, 917-925 (Year: 1965).*
International Search Report for PCT/JP2017/034545, dated Dec. 26, 2017 (5 pages).
Written Opinion for PCT/JP2017/034545, dated Dec. 26, 2017 (4 pages).
Spanish Search Report for Application No. 201890082, dated Mar. 5, 2019 (8 pages).
Extended European Search Report for Application No. 17893530.0, dated Jun. 9, 2020 (9 pages).

* cited by examiner

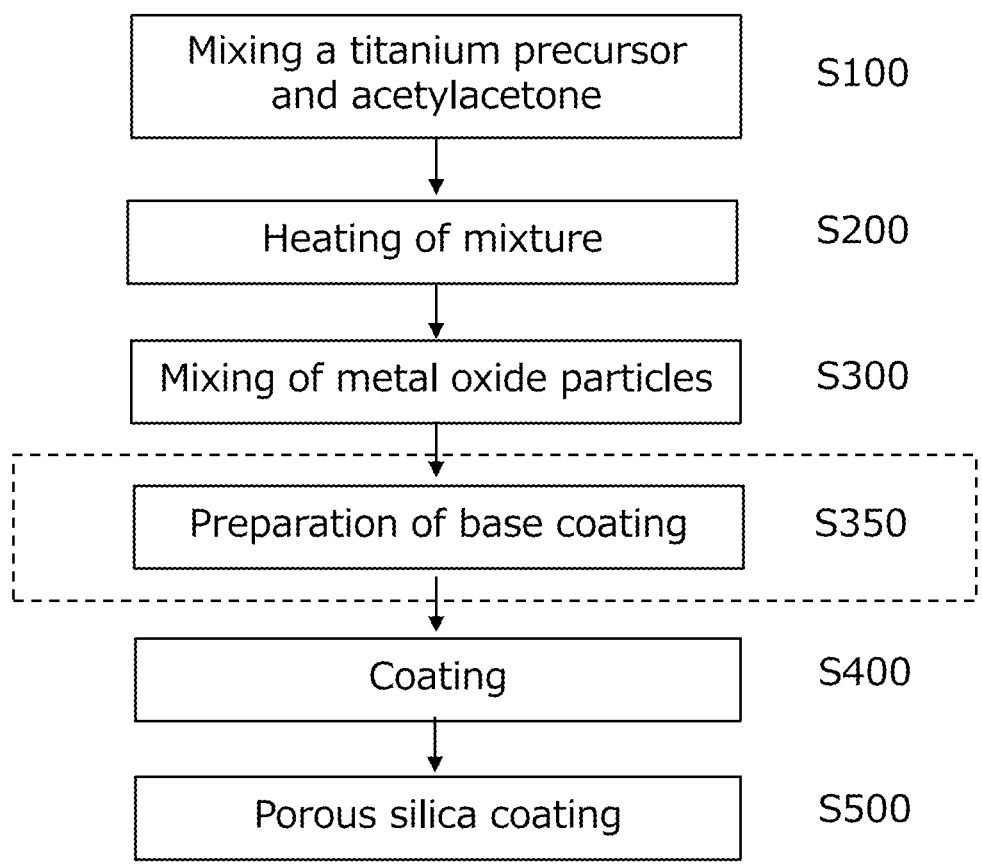

Example 2 (TTiP : AcAc = 1:0)

Example 3 (TTiP : AcAc = 1:0.5)

Example 4 (TTiP : AcAc = 1:1)

Example 5 (TTiP : AcAc = 1:1.5)

Example 1 (TTiP : AcAc = 1:2)

Example 6 (TTiP : AcAc = 1:3)

Example 7 (TTiP : AcAc = 1:4)

Example 8 (TTiP : EAcAC = 1:2)

Lower magnification

Higher magnification

Example 9 (TTiP : DEM = 1:2)

Lower magnification

Higher magnification

Example 10 (TTiP : DEM = 1:4)

Lower magnification

Higher magnification

Porous coating (3-D coating) of Example 1

Flat coating of Example 21

| 6301 | | |
|---|---|---|
| Wave length (nm) | Reflectance(%) | |
| | Flat coating | 3-D coating |
| 700 | 7.30 | 4.49 |
| 600 | 7.26 | 4.08 |
| 500 | 7.42 | 3.79 |
| 400 | 7.37 | 3.37 |

| 6340 | | |
|---|---|---|
| Wave length (nm) | Reflectance(%) | |
| | Flat coating | 3-D coating |
| 700 | 8.92 | 4.72 |
| 600 | 8.33 | 3.58 |
| 500 | 8.15 | 3.23 |
| 400 | 8.54 | 3.25 |

Base coating (3250 flat coating)

Absorber coating (3250 (3-D) coating)

ABSORBER COATING FOR SOLAR HEAT POWER GENERATION AND MANUFACTURING METHOD THEREOF

CROSS-REFERENCE TO RELATED APPLICATIONS

This application is a U.S. National Stage application of International Application No. PCT/JP2017/034545 filed on Sep. 25, 2017 and claims priority to Japanese Patent Application No. 2017-010110 filed on Jan. 24, 2017 in Japan, and all contents described in the above applications are hereby incorporated by reference in their entirety.

In addition, all contents described in all patents, patent applications, and documents cited in the present application are incorporated herein by reference in their entirety.

BACKGROUND

Technical Field

The present invention relates to a heat absorber coating usable for solar heat power generation (also referred to as "concentration solar power generation") and a manufacturing method thereof.

Related Art

In recent years, the necessity of fossil fuel substitute energy is increasing from the viewpoint of environmental problems and depletion of fossil energy resources and the like. Solar photovoltaic generation and solar heat power generation are known as a method of generating electricity using sunlight, a representative natural energy. Solar photovoltaic generation is a system that converts sunlight directly into electric power, and is now in practical use all over the world. On the other hand, solar heat power generation is a method of collecting sunlight and using it as a heat source to generate electricity by turning a turbine. In the case of converting sunlight into heat, solar energy can be converted with higher efficiency than when converting sunlight directly into electricity, which has been brought to attention in recent years (see, for example, Japanese Patent Laid-Open No. 2015-148205).

For example, a coating containing chromium nitride is used as a heat absorber coating used for a heat collector of solar heat power generation, but there is concern that chromium nitride imposes a large environmental burden. Therefore, a titanium oxynitride thin coating having a property of absorbing visible light has been proposed (see, for example, Japanese translation of PCT international application No. H09-507095). In addition, it is disclosed that carbon is added to titanium oxynitride to improve the visible spectral absorptance (see, for example, Japanese Patent Laid-Open No. 2006-001820). Also, prior to the present invention, the present inventor invented a coating containing titanium oxide and carbon nanotubes and successfully developed a heat absorber coating having higher practical utility than before (refer to Japanese Patent Laid-Open No. 2012-201589).

With the coating described in Japanese translation of PCT international application No. H09-507095, titanium oxynitride can absorb visible light. In the coating of Japanese Patent Laid-Open No. 2006-001820, in addition to the visible light absorption of titanium oxynitride, the addition of carbon can improve visible spectral absorptance and infrared light radiation. However, it is desired to efficiently collect heat by further improving the spectral absorptance of the coatings.

The heat absorber coating developed by the present inventor, that is, the coating obtained by adding carbon nanotubes to titanium oxide has superior characteristics to the conventional one. However, there is a possibility that carbon may be oxidized and consumed at a high temperature, and in order to promote practical application of solar heat power generation, a coating excellent in thermal oxidation resistance that can be used at a higher temperature is desired.

An object of the present invention is to provide a heat absorber coating for solar heat power generation having excellent thermal oxidation resistance and high spectral absorptance and a method of manufacturing the same.

SUMMARY

As a result of diligent research by the present inventors to solve the above problem, it has been found that a coating suitable for solar receiver in solar heat power generation can be obtained by coating titanium oxide on the inside and outside of a porous structure (also referred to as a three-dimensional coating, or 3-D coating) in which particles of a metal oxide having a higher thermal oxidation resistance than a carbon nanotube are partially joined to each other, and finally completed the present invention. Specifically, the object of the present invention was achieved by the following means.

(1) One embodiment of the present invention is an absorber coating for solar heat power generation, the coating having a network structure of a composite particle that comprises particles of metal oxide comprising mainly two or more metals selected from Mn, Cr, Cu, Zr, Mo, Fe, Co and Bi, and titanium oxide partly or entirely coating on the surface of the particle of metal oxide, wherein an arithmetic mean estimation of the surface of the coating is 1.0 µm or more, and a ratio of a network area of the composite particle to a plane area of the coating is 7 or more.

(2) Another embodiment of the present invention is preferably the absorber coating for solar heat power generation, wherein the metal oxide comprises mainly two or more metals among Cr, Mn and Cu.

(3) Another embodiment of the present invention is preferably the absorber coating for solar heat power generation, further comprising a porous silica coating on the top surface thereof.

(4) Another embodiment of the present invention is preferably the absorber coating for solar heat power generation of which spectral reflectance at a visible light region of a wave length from 400 nm to 700 nm is less than 5.0%.

(5) One embodiment of the present invention is a process for producing the absorber coating for solar heat power generation as described above, the process comprising a first mixing step of mixing titanium alkoxide (A), and at least one of acetylacetone and ethyl acetoacetate (B) in a molar ratio of A:B=1:1 or more, a second mixing step of mixing the particles of metal oxide comprising mainly two or more metals selected from Mn, Cr, Cu, Zr, Mo, Fe, Co and Bi, in a mixture after the first mixing step, and a coating step of supplying a mixture after the second mixing step on a substrate to form a coating.

(6) Another embodiment of the present invention is preferably the process for producing the absorber coating for solar heat power generation, wherein the coating step is a step of spraying the mixture on the substrate heated at 250 to 400° C.

(7) Another embodiment of the present invention is preferably the process for producing the absorber coating for solar heat power generation, wherein the coating step comprises a spraying step of spraying the mixture on the substrate at a temperature of less than 250° C., and a heating step of heating the mixture at 250 to 400° C. after the spraying step.

(8) Another embodiment of the present invention is preferably the process for producing the absorber coating for solar heat power generation, wherein the metal oxide comprises mainly two or more metals selected from Cr, Mn and Cu.

(9) Another embodiment of the present invention is preferably the process for producing the absorber coating for solar heat power generation, the process further comprising a silica coating step of forming a porous silica coating on the top surface thereof.

(10) Another embodiment of the present invention is preferably the process for producing the absorber coating for solar heat power generation, wherein a spectral reflectance of the coating at a visible light region of a wave length from 400 to 700 nm is preferably less than 5.0%.

Advantageous Effects of Invention

According to the present invention, it is possible to obtain an absorber coating for solar heat power generation, which has excellent thermal oxidation resistance and high spectral absorptance.

BRIEF DESCRIPTION OF DRAWINGS

FIG. 1C shows a flow of a main process of a process for producing an absorber coating for solar heat power generation according to still another embodiment.

DETAILED DESCRIPTION

Figure 1A:
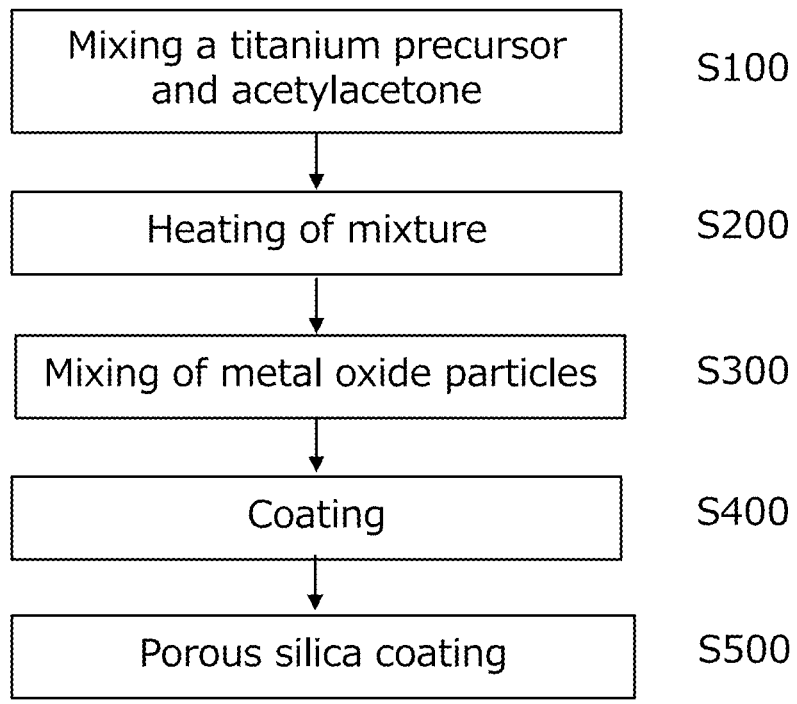
FIG. 1A shows a flow of main steps of the process for producing an absorber coating for solar heat power generation according to this embodiment.

Preferred embodiments of the present invention will now be described with reference to the drawings. It is to be noted that the embodiments described below do not limit the invention of the claims, and all the elements and combinations thereof described in the embodiments are not necessarily essential to the solution of the present invention.

1. Constituent Materials of Absorber Coating for Solar Heat Power Generation

The absorber coating for solar heat power generation according to the present embodiment has a network structure of composite particles comprising metal oxide particles and titanium oxide partially or entirely covering the surface of the particles. The absorber coating for solar heat power generation preferably has a porous silica coating on its outermost surface. Note that the absorber coating for solar heat power generation may contain a material other than the metal oxide particles, titanium oxide covering the surface thereof, and porous silica coating on the outermost surface of the absorber coating for solar heat power generation.

(1) Particles of Metal Oxide

Particles of metal oxide forming the absorber coating for solar heat power generation preferably have an average particle size in the range of 0.5 to 5 µm. The particle size including the average particle diameter is measured by laser diffraction scattering method. The metal oxide is a metal oxide particle mainly containing two or more metals selected from Mn, Cr, Cu, Zr, Mo, Fe, Co and Bi.

Preferred metal oxides include:
(a) those mainly containing oxides of Cr, Mn, Cu, Mo and Zr;
(b) those mainly containing oxides of Cr, Mn, Cu and Zr;
(c) those mainly containing oxides of Mn, Fe and Co;
(d) those mainly containing oxides of Cu, Mo and Fe;
(e) those mainly containing oxides of Cr, Cu and Zr;
(f) those mainly containing oxides of Cr and Cu;
(G) those mainly containing oxides of Cr, Mn, Cu and Mo;
(h) those mainly containing oxides of Cr, Mn and Cu;
(i) those mainly containing oxides of Cr, Mn and Bi;
(J) those mainly containing oxides of Cr and Fe;
(k) those mainly containing oxides of Mn and Fe; and
(l) those mainly containing oxides of Cr, Cu.
The metal oxide may be a mixed oxide of a plurality of simple metal oxides, or may be a composite oxide in which plural kinds of metals constitute oxides. For example, a composite oxide having a spinel structure can be suitably exemplified. Among the above mentioned metal oxides, those containing mainly two or more metals from Cr, Mn and Cu are particularly preferable.

(2) Coating of Titanium Oxide

Titanium oxide has a foam of coating covering the particle surface of the metal oxide. The titanium oxide may cover the entire surface of the particle or cover a part of the surface of the particle. The metal oxide particles form the skeleton of the absorber coating for solar heat power generation, and constitute a three-dimensional network-like porous body. Titanium oxide may sometimes be present at the junction between the particles, but sometimes it is not interposed. The titanium oxide preferably has an anatase type crystal structure when it is not used as a part of the collector for solar heat power generation. However, since it is exposed to high temperatures when used as a condenser, it can be converted to a rutile type crystal structure. Note that the titanium oxide coating may have a rutile type crystal structure from the beginning.

(3) Porous Silica Coating

The porous silica coating is a coating that covers an outermost surface of the absorber coating for solar heat power generation. The coating must be resistant to the thermal expansion when the absorber coating for solar heat power generation and the substrate on which the coating is formed thermally expand. The reason why the porous silica coating is formed is to prevent the collapse of the porous three-dimensional coating and to make it resistant to thermal expansion.

2. Configurations and Characteristics of Absorber Coating for Solar Heat Power Generation The absorber coating for solar heat power generation is a coating famed on a substrate and is a porous coating (may be called a three-dimensional coating) that has many pores (whether open pores or closed pores). As the substrate, a metal material having a high thermal conductivity such as a steel sheet, a copper sheet, an aluminum sheet, an aluminum-plated steel sheet, an aluminum alloy plated steel sheet, a copper-plated steel sheet, a tin-plated steel sheet, a chromium plated steel sheet, a stainless-steel sheet or a nickel-base superalloy. By using a metal material having high thermal conductivity as a substrate, heat conducted by the absorber coating for solar heat power generation can be further easily conducted from the substrate to a material to be heated. Among them, a material having high heat resistance such as a stainless-steel sheet or a nickel-base superalloy is more preferably used as the substrate. The ratio of the network area (S2) of the composite particles to the projected area (the plane surface area of the coating: S1) of the porous coating (=S2/S1) is preferably 7 or more, more preferably 8 or more. The larger S2/S1, the larger the area increased by the presence of pores in the porous body. Therefore, the absorber coating for solar heat power generation preferably has a large number of pores so that a surface area thereof is seven times or more, more preferably eight times or more to the projected area of its surface. The surface roughness of the absorber coating for solar heat power generation is preferably 1.0 µm or more in arithmetic average roughness (Ra). Further, the maximum height (Rz) of the surface of the absorber coating for solar heat power generation is preferably 14 µm or more, more preferably 16 µm or more. When the metal oxide mainly contains two or more metals from Cr, Mn and Cu, Ra is preferably 1.0 µm or more.

The term, "projected area" means the area of a certain measurement area (microscopic field of view) as viewed in a direction perpendicular to the surface of the substrate (thickness direction of the substrate). "The surface area to the projected area is seven times of more" means that the actual surface area in the measurement area is seven times or more to the projected area of the measurement area. "Surface area to the projected area", "Ra" and "Rz" can be values measured using a shape measuring laser microscope.

The porous coating obtained by coating a metal oxide particle network with a titanium oxide coating may be formed directly on the substrate, but it is also possible to form, at first, a base material containing a metal oxide and titanium oxide on the substrate, and then to form the porous coating.

The absorber coating for solar heat power generation according to this embodiment is preferably a coating having a spectral reflectance of less than 5% in the visible light region of a wavelength from 400 nm and to 700 nm (synonymous with 400 nm or more and 700 nm or less, which includes numerical values at both ends. The same applies hereafter). "Spectral reflectance is less than 5%" means "spectral absorptance is 95% or more". From the viewpoint of heat collection, it is important that the spectral reflectance is low (that is, the spectral absorptance is high) in the wavelength range of sunlight in a specific range of wavelength from 400 to 700 nm. When used at high temperature (800 to 900° C.) like tower type solar heat power generation, it is considered that heat radiation starts around 700 nm in wavelength. Therefore, it is desirable that the absorber coating has a particularly high spectral absorptance in the wavelength range from 400 nm to 700 nm. In addition, it is desirable to have the spectral reflectance of the absorber coating, not only in the visible light region from 400 to 700 nm, but also in the wavelength region exceeding 700 nm is preferably less than 20%, more preferably less than 15%, still more preferably less than 10%.

3. Process for Producing the Absorber Coating for Solar Heat Power Generation

FIG. 1A shows a flow of main steps of a typical process for producing the absorber coating for solar heat power generation according to this embodiment.

As shown in FIG. 1A, the process for producing the absorber coating for solar heat power generation according to this embodiment preferably includes a first mixing step (S100) of mixing a titanium precursor and acetylacetone, a mixture heating step (S200) of heating the mixture mixed in the first mixing step, a second mixing step (S300) of mixing the particles of a metal oxide mainly containing two or more metals selected from Mn, Cr, Cu, Zr, Mo, Fe, Co and Bi, a coating step (S400) of supplying the mixture after the second mixing step on the substrate to form a coating, and a silica coating step (S500) of forming a porous silica coating on the top surface of the absorber coating for solar heat power generation. Here, the coating step is preferably a step of spraying the mixture onto a substrate heated at 250 to 400° C., more preferably 280 to 360° C.

Figure 1B:
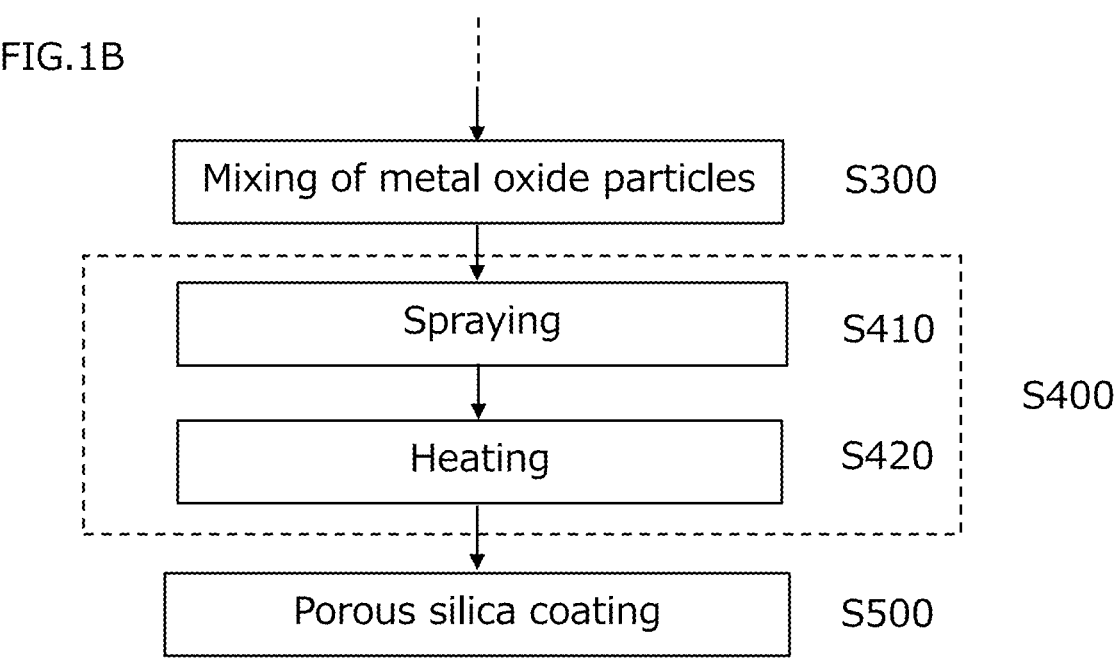
FIG. 1B shows a flow of main steps of the process for producing an absorber coating for solar heat power generation according to another embodiment.

Further, as shown in FIG. 1B, another process for producing the absorber coating for solar heat power generation preferably includes, subsequently to the above S100 to S300, a spraying step (S410) of spraying the mixture onto the substrate at a temperature lower than 250° C., and a heating step (S420) of heating the mixture at 250 to 400° C., more preferably 280 to 360° C., after the spraying step. In this heating step, the substrate supplied with the mixture may be heated, or the mixture may be heated by a heat source that is brought into contact with or kept close to.

Next, each of the steps of the process shown in FIG. 1A will be described in more detail.

Each Step in FIG. 1A (1) First Mixing Step (S100)

In the first mixing step, the titanium oxide precursor is mixed with at least one of acetylacetone and ethyl acetoacetate. The titanium oxide precursor can be thermally decomposed to titanium oxide. As the titanium oxide precursor, organic titanium compounds and inorganic titanium compounds are present. Mixing may be performed using any equipment such as a stirrer, a magnetic stirrer, an ultrasonic generator and the like. A suitable ratio between the titanium oxide precursor (A) and at least one (B) of acetylacetone and ethyl acetoacetate is A:B=1:1 or more, preferably 1:1.5 or more, and more preferably A:B=1:1.5 to 4.

Examples of the organic titanium compound include titanium tetramethoxide, titanium tetraethoxide, titanium tetraallyl oxide, titanium tetra n-propoxide, titanium tetraisopropoxide, titanium tetra n-butoxide, titanium tetraisobutoxide, titanium tetra sec-butoxide, titanium tetra t-butoxide, titanium tetra n-pentyl oxide, titanium tetracyclopentyl oxide, titanium tetrahexyl oxide, titanium tetracyclohexyl oxide, titanium tetrabenzyl oxide, titanium tetraoctyl oxide, titanium tetrakis (2-ethylhexyl oxide), titanium tetradecyl oxide, titanium tetradodecyl oxide, titanium tetrastearyl oxide, titanium tetrabutoxydimer, titanium tetrakis (8-hydroxyoctyloxide), titanium diisopropoxide bis(2-ethyl-1,3-hexanediolato), titanium bis(2-ethylhexyloxy)bis(2-ethyl-1,3-hexanediolato), titanium tetrakis(2-chloroethoxide), titanium tetrakis(2-bromoethoxide), titanium tetrakis(2-methoxyethoxide), titanium tetrakis(2-ethoxyethoxide), titanium butoxide trimethoxide, titanium dibutoxide dimethoxide, titanium butoxide triethoxide, titanium dibutoxide diethoxide, titanium butoxide triisopropoxide, titanium dibutoxide diisopropoxide, titanium tetraphenoxide, titanium tetrakis(o-chlorophenoxide), titanium tetrakis(m-nitrophenoxide), titanium tetrakis(p-methylphenoxide), titanium tetrakis(trimethylsilyloxide), diisopropoxytitanium bis(acetylacetonate), dinormalbutoxy bis (triethanolaminato) titanium, titanium stearate, titanium isopropoxy octyleneglycolate, tetraisopropoxytitanium polymer, tetranormalbutoxytitanium polymer, dihydroxy bis (lactato) titanium, propanedioxytitanium bis(ethyl acetoacetate), oxotitanium bis(monoammonium oxalate), trinormalbutoxytitanium monostearate, diisopropoxytitanium distearate, dihydroxy bis(lactato) titanium ammonium salt, and the like. These organic titanium compounds are used singly or in combination of two or more compounds.

Among these organotitanium compounds, titanium tetraisopropoxide is more preferably used from the viewpoints of storage stability of the material, selectivity of the solvent, relationship between the thermal decomposition temperature and crystallization temperature, adhesion to the substrate, and the like. Examples of the inorganic titanium compound include titanium chloride ($TiCl_4$) and the like. Note that an inorganic titanium compound and an organic titanium compound may be mixed and used.

The titanium oxide precursor may be used as it is, or may be used, with a solvent or a dispersion medium, as a solution or a dispersion such as a colloidal solution, an emulsion or a suspension. Particularly, in the case of spraying the titanium oxide precursor by spraying, it is preferable to use the titanium oxide precursor as a solution or dispersion in order to improve flowability. As a solvent or a dispersion medium for using the titanium oxide precursor as a solution or a dispersion, it is preferable to use alcohols such as ethanol, methanol, propanol, and butanol, hexane, toluene, chlorobenzene, methyl chloride, or perchlorethylene, etc. In addition, the solvent and the dispersion medium may contain a small amount of water.

At least one of acetylacetone and ethyl acetoacetate contributes to raising the temperature at which the titanium oxide precursor (preferably an organic titanium compound, particularly preferably a titanium alkoxide) thermally decomposes to titanium oxide. Acetylacetone or ethyl acetoacetate reacts with the titanium oxide precursor, resulting in the formation of a titanium-acetylacetone complex or a titanium-acetoacetate ethyl complex. In order for these complexes to thermally decompose into titanium oxide, relatively high temperatures are required. On the other hand, diethyl malonate has weaker coordination than acetylacetone and ethyl acetoacetate, and since the decomposition temperature of the complex formed by coordination is low, diethyl malonate is decomposed before the formation of oxide. It is considered that the difference in decomposition temperature of such a titanium complex is involved in the formation of a porous coating.

(2) Mixture Heating Step (S200)

The mixture heating step is a step of heating the mixture obtained after the first mixing step to react the titanium oxide precursor and at least one of acetylacetone and ethyl acetoacetate. Through this reaction, titanium acetylacetone complex is formed when acetyl acetone is used, and titanium acetoacetate ethyl complex is formed when ethyl acetoacetate is used. The temperature of heating the mixture is 60 to 100° C., preferably 70 to 90° C., more preferably 75 to 85° C. The heating time is not particularly limited, but is preferably 2 to 12 hours, more preferably 4 to 8 hours.

(3) Second Mixing Step (S300)

In the second mixing step, the particles of metal oxide comprising two or more metals selected from Mn, Cr, Cu, Zr, Mo, Fe, Co and Bi are added to the solution after the first mixing step and mixed with each other. Upon mixing, it is preferable to dilute the mixture obtained in the first mixing step (which may be referred to as a reaction solution) with an alcohol (preferably isopropyl alcohol) or the like. The ratio of the mixture (X) to the alcohol (Y) for dilution is preferably 1:1 to 6, more preferably X:Y=1:2 to 4, in terms of mass ratio. The particles of metal oxide (A) is mixed in the diluted and mixed liquid (B) with alcohol or the like, at a mass ratio in a range of A:B=1:10 to 100, more preferably A:B=1:20 to 50. Mixing can be carried out using any equipment such as a stirrer, a magnetic stirrer, an ultrasonic generator, as in the first mixing step.

(4) Coating Step (S400)

The coating step is a step of supplying the mixture after the second mixing step onto the substrate to form a coating. In this coating step, the mixture of the previous step is sprayed onto the substrate heated at 250 to 400° C., more preferably at 280 to 360° C. The spraying step is preferably carried out with a spray. To the substrate heated to the above temperature, the raw material prepared in the second mixing step is sprayed a predetermined number of times with a spray. In the raw materials sprayed onto the substrate, the organic solvent is volatilized, and the titanium oxide produced by thermal decomposition crystallizes on the particle surface of the metal oxide. In this process, the components bonded to titanium volatilize. Volatilization should occur in a short time rather than gradually occurring with warming. This is because the volatilization in such a short time greatly contributes to the formation of a large number of pores in the coating. Further, by spraying the raw material onto the substrate by spraying, a coating having both of uniform composition and uniform structure is formed.

The diameter of the spray nozzle is preferably 0.1 to 0.8 mm, more preferably 0.3 to 0.5 mm. The air pressure during spraying is preferably 0.1 to 0.4 MPa, more preferably 0.15 to 0.25 MPa. Further, in this step, after the raw material is sprayed, the next spraying may be performed after waiting until the temperature of the substrate rises (for example, waiting for 3 seconds). In addition, the spray time by spraying is preferably in the range of 50 to 280 seconds in the case of spraying on a surface of 3 cm×3 cm.

Further, the absorber coating for solar heat power generation formed on the substrate by the above production process is formed into a three-dimensional mesh-like configuration having many pores. As a result, the light receiving area of the absorber coating for solar heat power generation increases, and the light irradiated to the absorber coating for solar heat power generation becomes less likely to occur a specular reflection, and light can be efficiently absorbed. In particular, the spray coating described above enables to increase the light receiving area of the absorber coating easily and inexpensively without using a technique such as sputtering. Further, as compared with the sputtering technique or the like, the smaller size and larger number of the pores in the absorber coating for solar heat power generation are provided.

In addition, in the above process, since the absorber coating can be foiled on the substrate by spraying the raw materials onto the substrate with a spray, the absorber coating for solar heat power generation can be easily and inexpensively formed compared with, for example, the PVD method (Physical Vapor Deposition method) or the sputtering method. However, the process of forming the absorber coating for solar heat power generation is not limited to spraying, and other methods may be used. Further, in the coating step, not only the spraying but also any coating method such as spin coating, printing, etc. may be used.

(5) Silica Coating Step (S500)

The silica coating step is a step for forming a porous silica coating on the outermost surface of the absorber coating for solar heat power generation. This step is optional and may not be performed. In addition, by forming the porous silica coating on the outermost surface, there is the merit that it can protect the absorber coating for solar heat power generation and prevent collapse and chipping due to use. In order to form the porous silica coating, a solution of organosilane represented by, for example, dimethyldichlorosilane, trimethoxyethylethoxysilane, tetraethoxysilane, or the like is sprayed on the outermost surface of the absorber coating, and the porous silica coating is formed by heating. As an example of a preferable method for forming the porous silica coating, an alkoxysilane represented by tetraethylorthosilicate and hydroxyacetone are mixed in the presence of ethanol and/or water, and the obtained solution is further dissolved in ethanol or the like, which is sprayed onto the coating obtained in step S400, and heated at an appropriate temperature within the range of 300 to 500° C. In the present specification, the term "absorber coating for solar heat power generation" or "absorber coating" includes a case where the silica coating is included and a case where it is not included, depending on the context. Hereinafter, the absorber coating for solar heat power generation which does not include the silica coating and is famed in the coating forming step (S400) is particularly referred to as "light absorber coating".

Each Step in FIG. 1B

S100 to S300 and S500 are the same as respective steps described above. Here, only S400 which is different from the flow shown in FIG. 1A will be described.

(1) Spraying Step (S410)

The spraying step constitutes a part of the coating step (S400), and is a step of spraying the mixture obtained in the second mixing step onto the substrate at a temperature lower than 250° C.

(2) Heating Step (S420)

The heating step constitutes a part of the coating step (S400), and is a step of heating the mixture to a temperature from 250 to 400° C. after the spraying step.

In this way, without spraying the mixture onto the substrate heated at 250° C. or more, by spraying the mixture onto the substrate at a lower temperature than 250° C., and then heating the substrate to a temperature at 250° C. or higher, the absorber coating for solar heat power generation can be produced.

Each Step in FIG. 1C

S100 to S500 are the same as each of the steps in FIG. 1A. Here, only a new step of preparation of base coating (S350) added between the second mixing step (S300) and the coating step (S400) in FIG. 1A will be described.

(1) Base Coating Preparation Step (S350)

In the base coating preparation step, before supplying the mixture on the substrate after the second mixing step (S300) to form a coating, a base coating (underlayer coating) is applied. This step is optional and may not be performed. Incidentally, by forming a base coating between a three-dimensional coating (light absorber coating) made of a porous body and the substrate, there is a merit to enhance adhesion between the substrate and the light absorber coating and to further improve durability of the absorber coating for solar heat power generation.

The material constituting the base coating is not particularly limited as long as it has adhesiveness to the substrate and the light absorber coating and does not lower thermal conduction from the light absorber coating to the substrate, but it is preferable to contain metal oxide particles. By including the metal oxide, the degree of blackness of the absorber coating is increased, heat is efficiently transferred to the substrate by thermal conduction of the metal oxide, and heat radiation is suppressed. In addition, in order to enhance the adhesion to the substrate, it is preferable to form a flat coating by bonding the metal oxide particles. Therefore, it is possible to coat and bind the surface of the metal oxide particle with, for example, an organic titanium polymer. In order to form the base coating, there is a method of spraying and heating a mixed solution containing the base coating material onto the substrate surface under heating or non-heating conditions. As an example of a preferable method of forming the base coating, there is enumerated a method of mixing an organic titanium polymer mixed with an organic solvent and metal oxide particles used in the mixture heating step (S200), applying the obtained solution onto the substrate by spraying, and heating at an appropriate temperature within the range from 300 to 500° C. The organotitanium polymer is not particularly limited as long as it is a generally available material, but for example, it can be produced by thermally crosslinking and polymerizing the above-mentioned organotitanium compound.

The thickness of the base coating may be about 2 to 15 µm, preferably 5 to 10 µm, and more preferably 7 to 9 µm. After the base coating preparation step (S350), the coating step (S400) and the porous silica coating step (S500) are performed. The absorber coating for solar heat power generation obtained through each of the steps shown in FIG. 1C has a three-layer structure of a base coating, a light absorber coating and a silica coating, and its coating thickness is usually 15 to 50 µm, preferably 20 to 30 µm.

(2) Alternatives of Base Coating Preparation Step (S350)

In place of the mixed solution containing the organotitanium polymer used for preparing the base coating in the above, other metal complexes may be used. For example, 4 g of an aluminum complex (ethyl acetate aluminum diisopropylate manufactured by Kawaken Fine Chemicals Co., Ltd.; active ingredient concentration 75% by weight, solvent IPA) and 6 g of isopropyl diglycol (iPDG) manufactured by Nippon Nyukazai Co., Ltd. are mixed by ultrasonic irradiation for 15 minutes with a washer. To this mixture, 9 g of powdered metal oxide (manufactured by Asahi Kasei Kogyo Co., Ltd., No. Black 3250LM, particle diameter about 700 nm) are mixed and heated and stirred at 60° C. for 24 hours. Thereafter, the mixture of repeated ultrasonic treatment for 15 minutes is applied by spin coating or spraying to foam a coating on the substrate. After the coating, the base coating (flat coating) can be produced by placing the substrate on a heater heated to 350° C. and allowing to stand for 1 hour.

4. Solar Collector

Next, a solar collector having the absorber coating for solar heat power generation according to the present embodiment will be described.

The solar collector includes the absorber coating for solar heat power generation described above and a substrate for supporting the absorber coating for solar heat power generation. Such a solar collector can efficiently absorb sunlight and collect heat. This is because the absorber coating for solar heat power generation has a high spectral absorptance and is easy to transmit heat to the back-surface side of the coating.

The solar collector is, for example, configured to receive sunlight to a pipe having the absorber coating for solar heat power generation on its surface and heat a solvent flowing inside the pipe (oil for use at low temperature, or molten salt for use at high temperature). Since the pipe is directly connected to the heat exchanger, the heated molten salt or the like can heat water or the like in the heat exchanger portion.

EXAMPLES

Next, experimentals (including examples and comparative examples) of the present invention will be described. However, the present invention is not limited to the examples described below.

1. Compounds Used and their Abbreviations
(1) Titanium Oxide Precursor
   Titanium tetraisopropoxide: (manufactured by Kanto Kagaku Co., Ltd., catalog number: 40884-05) is abbreviated as "TTiP".
(2) Acetylacetone: (manufactured by Kanto Kagaku Co., Ltd., catalog number: 01040-71) is abbreviated as "AcAc".
(3) Ethyl acetoacetate: (manufactured by Tokyo Chemical Industry Co., Ltd., product number: A0649) is abbreviated as "AcAc".
(4) Diethyl malonate: (manufactured by Wako Pure Chemical Industries, Ltd., catalog number: 057-01436) is abbreviated as "DEM".

(d) (Fe, Cr)$_2$O$_3$: (manufactured by Asahi Kasei Kogyo Co., Ltd., No. Black 6340 Chromium Iron Oxide) is abbreviated as "6340".
(e) (Bi, Mn)$_2$O$_3$: (manufactured by Asahi Kasei Kogyo Co., Ltd., No. Black 6301 Bismuth Manganate Black Rutile is abbreviated as "6301".
(f) CuCr$_2$MnO$_5$: (manufactured by Shepherd Color Japan, No. BLACK 20C920 Copper Chromite Black Spinel) is abbreviated as "920".
(g) CuCr$_2$O$_4$: (manufactured by Shepherd Color Japan, No. BLACK 30C965 Copper Chromite Black Spinel) is abbreviated as "965".
(h) CuCr$_2$O$_4$: (manufactured by Shepherd Color Japan, No. Black 1G Copper Chromite Black Spinel) is abbreviated as "1G".
(i) (Mn, Cu, Fe) (Mn, Fe)$_2$O$_4$: (manufactured by Shepherd Color Japan, No. Black 444 Manganese Ferrite Black Spinel) is abbreviated as "444".
(j) Cu(Cr, Mn)$_2$O$_4$: (Tokan Material Technologies Co., Ltd., No. 42-302A Copper Chromite Black Spinel) is abbreviated as "302A".
(k) Cu(Cr, Mn)$_2$O$_4$: (Tokan Material Technologies Co., Ltd., No. 42-303B Copper Chromite Black Spinel) is abbreviated as "303B".
(l) Copper Chromite Black Spinel (manufactured by Asahi Kasei Kogyo Co., Ltd.) No. Black 3250LM, particle size: ca. 700 nm) is abbreviated as "3250"
(7) Organosilane
   Orthosilicate tetraethyl: (manufactured by Tokyo Chemical Industry Co., Ltd.) is abbreviated as "TEOS".
(8) Hydroxyacetone: (manufactured by Tokyo Chemical Industry Co., Ltd.) is abbreviated as "HA"

The composition of each of the above metal oxides is shown in Table 1. The mark "%" in the table means the mass % of each metal oxide when the whole metal oxide is taken as 100%. Also, the numerical values in Table 1 are merely metal oxide converted values in the left column. The metal in the metal oxide may take the form of an oxide other than the left column.

TABLE 1

|  | 3250 | 920 | 3702 | 3402 | 6331 | 965 | 1G | 302A | 303B | 6301 | 6340 | 444 |
|---|---|---|---|---|---|---|---|---|---|---|---|---|
| Cr$_2$O$_3$ | 50.69% | 43.88% | 62.60% |  |  | 68.72% | 60.79% | 60.62% | 37.71% |  | 39.36% | 36.74% |
| MnO | 26.52% | 39.50% | 9.55% | 27.87% |  |  |  | 11.56% | 36.50% | 35.41% |  |  |
| CuO | 22.50% | 16.59% | 27.51% |  | 37.85% | 30.94% | 39.21% | 27.58% | 25.79% |  |  | 24.27% |
| MoO$_3$ | 0.28% |  | 0.21% |  | 44.18% |  |  | 0.24% |  |  |  |  |
| ZrO$_2$ | 0.02% | 0.04% | 0.13% |  |  | 0.34% |  |  |  |  |  |  |
| Fe$_2$O$_3$ |  |  |  | 35.40% | 17.97% |  |  |  |  |  | 60.64% | 38.98% |
| Co$_2$O$_3$ |  |  |  | 35.73% |  |  |  |  |  |  |  |  |
| Bi$_2$O$_3$ |  |  |  |  |  |  |  |  |  | 64.59% |  |  |

(5) Solvent for Dilution
   Isopropyl alcohol: (manufactured by Wako Pure Chemical Industries) is abbreviated as "IPA".
(6) Metal Oxide
   (a) Copper Chromite Black Spinel: (manufactured by Asahi Kasei Kogyo Co., Ltd., No. Black 3702) is abbreviated as "3702".
   (b) Iron Cobalt Black Spinel: (manufactured by Asahi Kasei Kogyo Co., Ltd., No. Black 3402) is abbreviated as "3402".
   (C) Cu (Fe, Mn)$_2$O$_4$: (manufactured by Asahi Kasei Kogyo Co., Ltd., No. F-6331-2 Coal Black) is abbreviated as "6331".

2. Analytical Method
(1) A scanning electron microscope (SEM, model: Miniscope® TM3030 Plus and S-4800) manufactured by Hitachi High-Technologies Corporation was used for observing the morphology of the coating surface.
(2) For measuring the surface area, the maximum height (Rz) and the arithmetic average roughness (Ra) with respect to the projected area of the coating, a shape measuring laser microscope of model "VK-X100" manufactured by Keyence Corporation was used.
(3) For the identification of the crystal form of titanium oxide in the coating, an X-ray diffractometer (model RINT 2500 HF, manufactured by Rigaku Corporation) using CuKα as a radiation source was used. The measurement was carried out at an operation speed of 2 degrees per minute and a step width of 0.02 degrees per minute.

(4) The spectral reflectance in the short wavelength region of 250 to 2500 nm was measured using an ultraviolet-visible spectrophotometer (model: 3100PC) manufactured by Shimadzu Corporation.

(5) The spectral reflectance in the long wavelength region of 2 to 20 μm was measured using a spectrophotometer (model: BIO-RAD FTS 6000) manufactured by Agilent Technologies.

(6) Thermal emittance in the wavelength range of 2 to 25 μm was measured using an infrared spectrometer (model: Varian 680-IR) manufactured by Agilent Technologies.

(7) Measurement of spectral absorptance was performed at room temperature using a spectrophotometer (Perkin Elmer UV/VIS/NIR Lambda 1050) at an incident angle of 8°. The spectrophotometer was equipped with an integrating sphere that measures "the spectral hemispherical directional reflection (HDR)" or "reflectance ρ" from the surface of the sample. As the sample are opaque, it was considered that there was no transmittance. Therefore $\rho(\lambda)+\alpha(\lambda)=1$, where $\alpha$ is the absorptance and $\lambda$ is the wavelength.

Spectral values were obtained with intervals of $\Delta\lambda=10$ nm. Spectral solar irradiance $G(\lambda)$ was calculated using standard G173-03 of the American Society for Testing and Materials Testing (ASTM). The overall absorptance relative to solar irradiation, or solar-weighted absorptance is expressed as αs and is defined as the following equation.

$$\alpha_s = \frac{\int_{280nm}^{2500nm} \alpha(\lambda)G(\lambda)d\lambda}{\int_{280nm}^{2500nm} G(\lambda)d\lambda} \quad (1)$$

This integral was evaluated by a midpoint approximation of the rectangular method. The lower limit in Equation (1) was set to 280 nm to correspond to the lower bound of G-173 data. The measurement of absorptance was done at room temperature, i.e. at 25° C. Based on the studies done with other high-temperature coatings (such as Pyromark), the spectral absorptance does not appear to be dependent on temperature.

3. Preparation of the Absorber Coating for Solar Heat Power Generation and Properties Thereof Example 1

61.85 g of TTiP and 43.58 g of AcAc were mixed to be TTiP:AcAc=1:2 (molar ratio), and heated at 80° C. to react TTiP and AcAc. Next, 306.963 g of IPA was placed in the reaction mixture to dilute the reaction mixture. Subsequently, 12.5 g of powdered metal oxide "920" was mixed. Next, the mixture (also referred to as the mixed solution) obtained in the above steps was placed in a spray device (spray gun made by HARDER & STEENBECK, 0.4 mm nozzle, trade name: Colani). The substrate made of SUS304 was heated to 315° C. and the coating was formed by spraying for 110 seconds on the substrate while moving the spray from one end side of the substrate to the other end side. The pressure during spraying was 0.2 MPa. Next, a mixture of 20.83 g of TEOS and 63.36 g of ethanol, and a mixture of 7.41 g of HA, 63.36 g of ethanol and 9.01 g of ion exchanged water were mixed to give 40° C. The mixture was diluted with ethanol to have a solid content concentration of 0.6% by mass, and the solution was put in the same spray apparatus as above. At room temperature, the substrate was sprayed on the above coating for 2 seconds, and the substrate was immediately heated to 400° C. and held for 1 hour to form a porous silica coating on the absorber coating.

Figure 2:
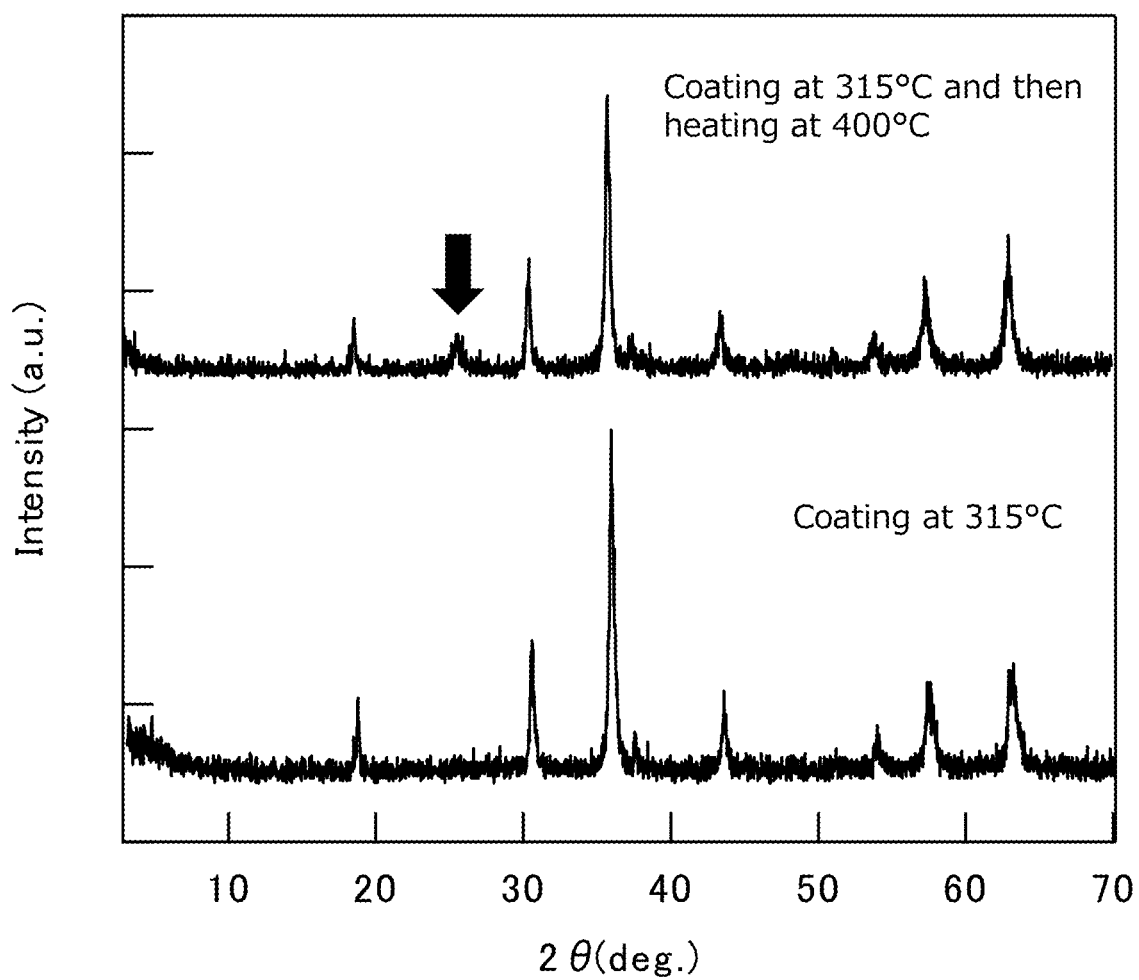
FIG. 2 shows the results of X-ray analysis of each of the absorber coatings for solar heat power generation obtained by heating at 315° C. and a coating heated at 400° C. thereafter.

In order to investigate the crystal morphology of the coating obtained under the above conditions after heated at 400° C., X-ray analysis of the coating obtained through the heating condition at 315° C. and of the coating obtained by heating it at 400° C. for 1 hour was carried out. An X-ray chart of each coatings is shown in FIG. 2. In the coating heated to 400° C., the peak of the anatase type titanium oxide (see the black down arrow) was observed, although it is not clear from the overlap with the peak of the metal oxide in the coating obtained through the heating condition of 315° C. From this result, it was found that the anatase type titanium oxide was finally formed by the reaction of TTiP and AcAc used at the time of preparing the absorber coating for solar heat power generation.

Examples 2 to 7

Figure 3:
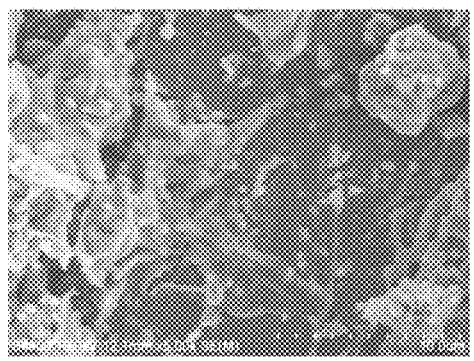
FIG. 3 shows SEM photographs comparing the structures of the coatings (Examples 1 to 7) prepared by changing the molar ratio of TTiP and AcAc.
Figure 3:
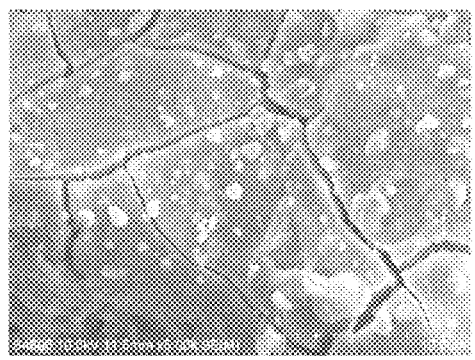
Figure 3:
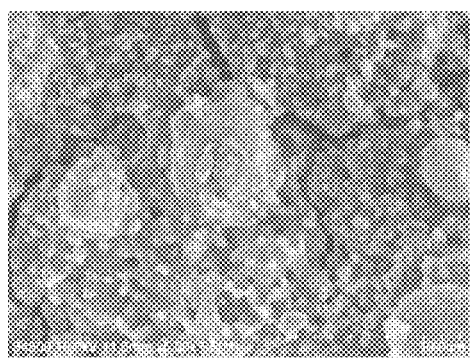
Figure 3:
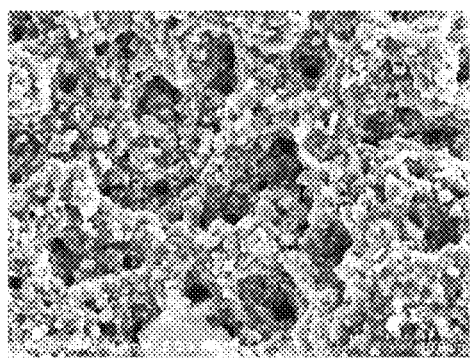
Figure 3:
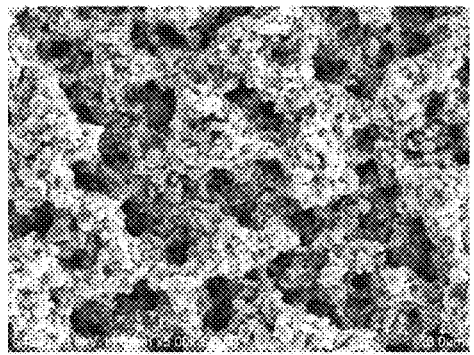
Figure 3:
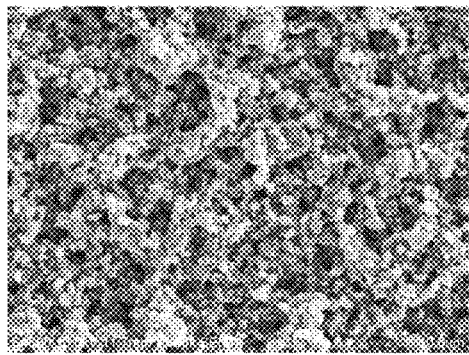
Figure 3:
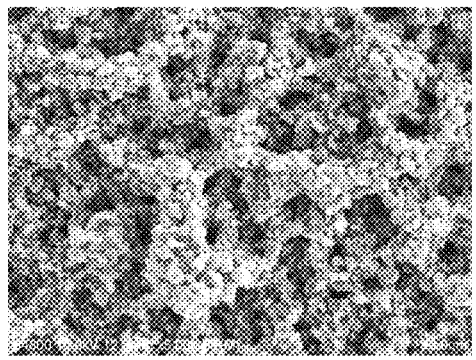

Various coatings were formed under the same condition as in Example 1, except that TTiP and AcAc were mixed at molar ratios: TTiP:AcAc=1:0 (Example 2), 1:0.5 (Example 3), 1:1 (Example 4), 1:1.5 (Example 5), 1:3 (Example 6) and 1:4 (Example 7), and surface morphologies of the coatings were observed. Those results in combination with Example 1 of TTiP:AcAc=1:2 in molar ratio were shown in FIG. 3. As is apparent from FIG. 3, coatings having a lot of pores could be formed in the case of TTiP:AcAc=1:1 or more (Examples 1, 4 to 7), preferably 1:1.5 or more (Examples 1, 5 to 7). Examples 2 and 3 correspond to comparative examples.

Examples 8 to 10

Figure 4:
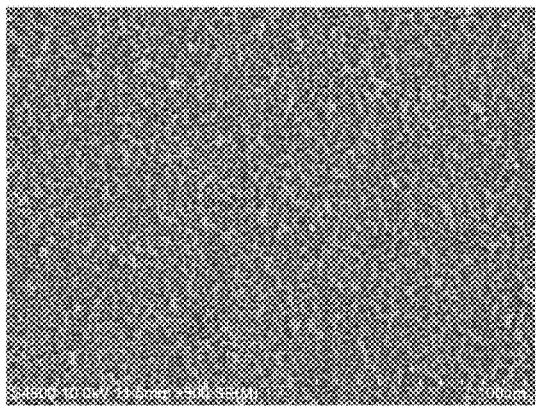
FIG. 4 shows SEM photographs of the coating surfaces prepared under the condition of Example 8, Example 9, and Example 10.
Figure 4:
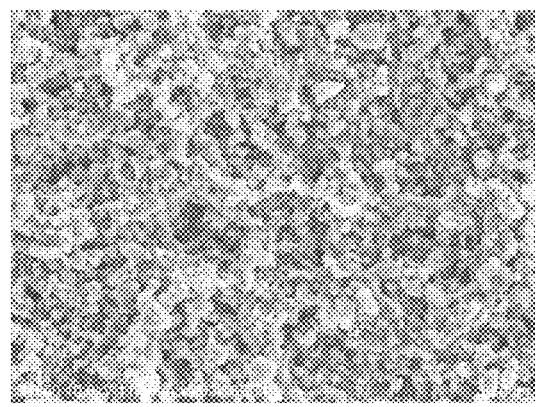
Figure 4:
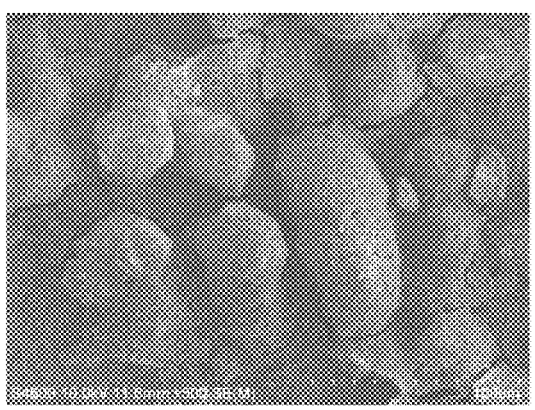
Figure 4:
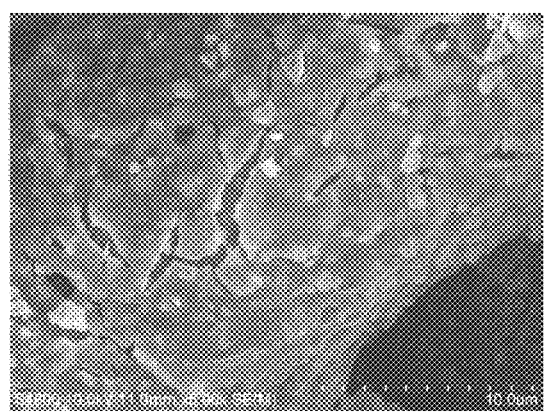
Figure 4:
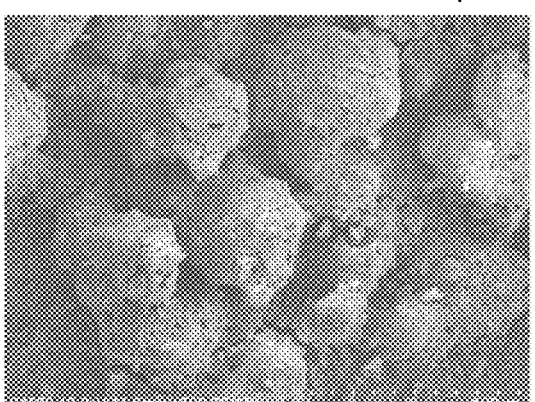
Figure 4:
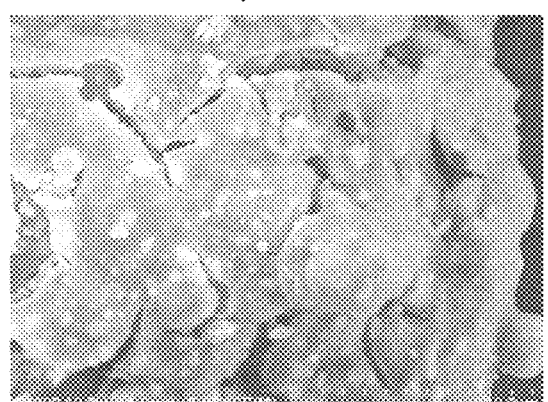

In place of AcAc, EAcAc (Example 8) and DEM (Examples 9, 10) were used with molar ratios of TTiP:EAcAc=1:2, TTiP:DEM=1:2 and TTiP:DEM=1:4, respectively, and coating was carried out under the same conditions as in Example 1 except for using each of the above molar ratios. Examples 9 and 10 correspond to comparative examples. FIG. 4 shows SEM photographs of respective coating surfaces. In FIG. 4, "low magnification" means the magnification of the photograph is 500 times, and "high magnification" means the magnification of the photograph is 5000 times. As can be seen from the morphologies shown in FIG. 4, when EAcAc was used, a porous coating similar to that when AcAc was used could be formed. However, when DEM was used, a porous coating could not be formed.

Examples 11 to 20

The powdery metal oxide "920" was replaced by each of "3702" (Example 11), "3402" (Example 12), "6331" (Example 13), "965" (Example 14), "1G" (Example 15), "302A" (Example 16), "303B" (Example 17), "6301" (Example 18), "6340" (Example 19) and "444" (Example 20), and coating was carried out under the same conditions as in Example 1 except for the metal oxide.

(Example 21)—Comparative Example—

As a comparison of Example 1, a flat coating was produced under the following conditions. First, 3 g of an organotitanium polymer (product number: B-10, tetra-n-butoxytitanium polymer) manufactured by Nippon Soda Co., Ltd., 6 g of isopropyl diglycol (iPDG) manufactured by Nippon Nyukazai Co., Ltd. and 1.85 g of 1-butanol (first grade reagent) manufactured by Wako Pure Chemical Industries were combined and mixed by ultrasonic irradiation for 15 minutes in an ultrasonic washer (trade name: Bransonic) manufactured by Branson. 9 g of powdered metal oxide "920" was added to the mixture, and prepared a mixture by irradiating ultrasonic waves again for 15 minutes. Next, this mixture was charged into a spray apparatus (spray gun made by HARDER & STEENBECK, 0.4 mm nozzle, trade name: Colani), and sprayed to SUS 304 without preheating (at room temperature) for 2 seconds at a pressure of 0.2 MPa to form a coating. Immediately after coating the mixture, the substrate was placed on a heater heated to 400° C. and allowed to stand for 1 hour. Thereafter, a porous silica coating was formed under the same conditions of Example 1.

(Examples 22 to 31)—Comparative Example—

The powdery metal oxide "920" was replaced by each of "3702" (Example 22), "3402" (Example 23), "6331" (Example 24), "965" (Example 25), "1G" (Example 26), "302A" (Example 27), "303B" (Example 28), "6301" (Example 29), "6340" (Example 30) and "444" (Example 31), and coating was carried out under the same conditions as in Example 21 except for the metal oxide.

Table 2 shows various characteristics caused by the morphology of the coatings prepared under the conditions of Examples 1, 11 to 15. Table 3 shows various characteristics caused by the morphology of the coating prepared under the conditions of Examples 16 to 20. Table 4 shows various characteristics caused by the morphology of the coatings prepared under the conditions of Examples 21 to 26. Table 5 shows various characteristics caused by the morphology of the coatings prepared under the conditions of Examples 27 to 31. In the table, the indication, "3-D" means that a porous coating (three-dimensional coating) is formed. The indication, "flat" means that a porous coating (three-dimensional coating) is not formed.

TABLE 2

|  | Example 1<br>920 (3-D) | Example 11<br>3702 (3-D) | Example 12<br>3402 (3-D) | Example 13<br>6331 (3-D) | Example 14<br>965 (3-D) | Example 15<br>1G (3-D) |
| --- | --- | --- | --- | --- | --- | --- |
| Network area ($\mu m^2$) | 162192.473 | 138626.938 | 136294.079 | 147933.274 | 140361.064 | 151031.629 |
| Projected area ($\mu m^2$) | 15649.473 | 15649.473 | 15649.473 | 15649.473 | 15649.473 | 15649.473 |
| Network area/Projected area | 10.3641 | 8.8582 | 8.7092 | 9.4529 | 8.969 | 9.6509 |
| Ra ($\mu m$) | 3.759 | 1.891 | 1.825 | 2.590 | 1.900 | 3.278 |
| Rz ($\mu m$) | 37.370 | 30.815 | 27.105 | 39.665 | 31.885 | 39.170 |

TABLE 3

|  | Example 16<br>302A (3-D) | Example 17<br>303B (3-D) | Example 18<br>6301 (3-D) | Example 19<br>6340 (3-D) | Example 20<br>444 (3-D) |
| --- | --- | --- | --- | --- | --- |
| Network area ($\mu m^2$) | 166305.365 | 155190.889 | 128442.438 | 145622.390 | 134448.903 |
| Projected area ($\mu m^2$) | 15649.473 | 15649.473 | 15649.473 | 15649.473 | 15649.473 |
| Network area/Projected area | 10.6269 | 9.9167 | 8.2075 | 9.3053 | 8.5913 |
| Ra ($\mu m$) | 3.227 | 2.865 | 1.632 | 3.499 | 6.737 |
| Rz ($\mu m$) | 38.060 | 31.950 | 29.550 | 44.285 | 47.805 |

TABLE 4

|  | Example 21<br>920 flat | Example 22<br>3702 flat | Example 23<br>3402 flat | Example 24<br>6331 flat | Example 25<br>965 flat | Example 26<br>1 G flat |
| --- | --- | --- | --- | --- | --- | --- |
| Network area ($\mu m^2$) | 27399.366 | 55080.999 | 65234.752 | 41036.073 | 40861.881 | 53185.925 |
| Projected area ($\mu m^2$) | 15491.455 | 15491.455 | 15491.455 | 15491.455 | 15491.455 | 15491.455 |
| Network area/Projected area | 1.768676086 | 3.55557299 | 4.211015169 | 2.648948921 | 2.637704528 | 3.433242713 |
| Ra ($\mu m$) | 0.3 | 0.4 | 0.86 | 0.909 | 0.35 | 0.634 |
| Rz ($\mu m$) | 7.54 | 10.85 | 12.75 | 12.665 | 8.585 | 11.35 |

TABLE 5

|  | Example 27<br>302A flat | Example 28<br>303B flat | Example 29<br>6301 flat | Example 30<br>6340 flat | Example 31<br>444 flat |
| --- | --- | --- | --- | --- | --- |
| Network area ($\mu m^2$) | 53974.509 | 44432.58 | 86645.829 | 64254.904 | 58792.541 |
| Projected area ($\mu m^2$) | 15491.455 | 15491.455 | 15491.455 | 15491.455 | 15491.455 |
| Network area/Projected area | 3.484147164 | 2.868199275 | 5.593136926 | 4.1477643 | 3.795159396 |
| Ra ($\mu m$) | 0.376 | 0.448 | 1.133 | 0.628 | 2.834 |
| Rz ($\mu m$) | 9.865 | 12.99 | 18.745 | 12.295 | 24.75 |

As is apparent from the comparison of Tables 2 to 5, the ratio of the "surface area/area" (that is, the ratio of the network area of the composite particle "S2" to the projected area "plane area: S1" of the coating=S2/S1) of the porous membrane exceeded 8.2, i.e. more than 8, while the S2/S1 of the flat coating was about 5.6 or less, i.e. less than 6.

Figure 5A:
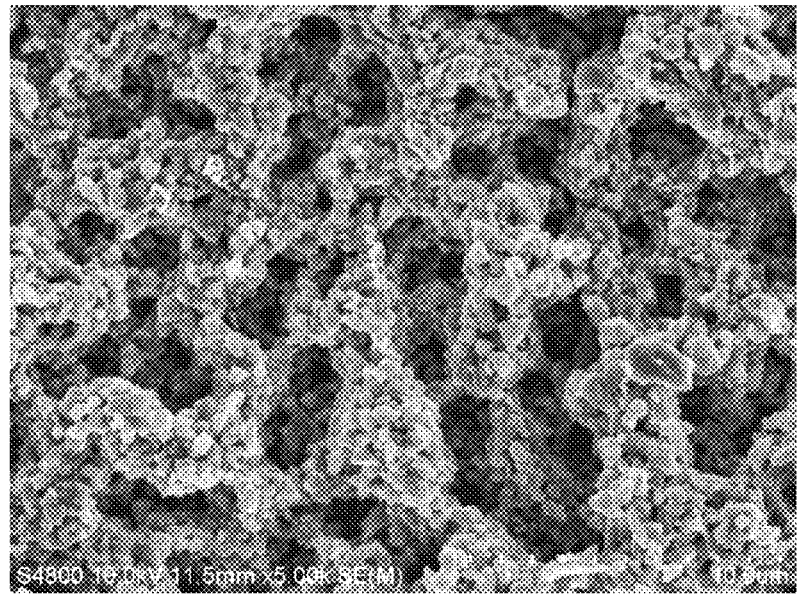
FIG. 5A shows a SEM photograph of the coating surface obtained under the condition of Example 1.
Figure 5B:
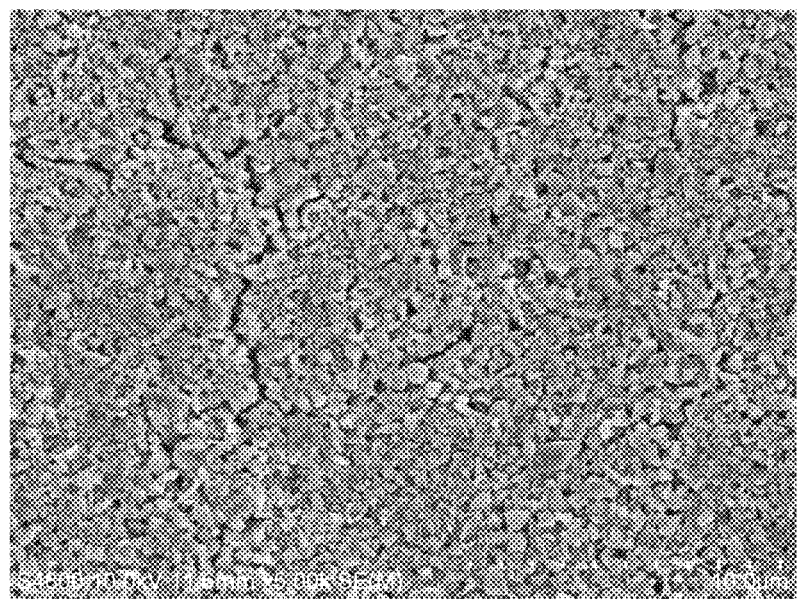
FIG. 5B shows a SEM photograph of the coating surface obtained under the condition of Example 21.

FIG. 5A shows a SEM photograph of the coating surface obtained under the condition of Example 1, and FIG. 5B shows a SEM photograph of the coating surface obtained under the condition of Example 21. The magnification of the photographs is both 5000 times. As is apparent from a comparison between both SEM photographs, a porous coating can be formed in Example 1 which has the step of reacting AcAc with TTiP, but a porous coating cannot be formed and a flat coating was formed in Example 21 which has the step of only dispersing a tetra-n-butoxytitanium polymer in iPDG.

Next, the spectral reflectance in short-wavelength regions of various three-dimensional coatings and various flat coatings will be described by comparing them.

Figure 6A:
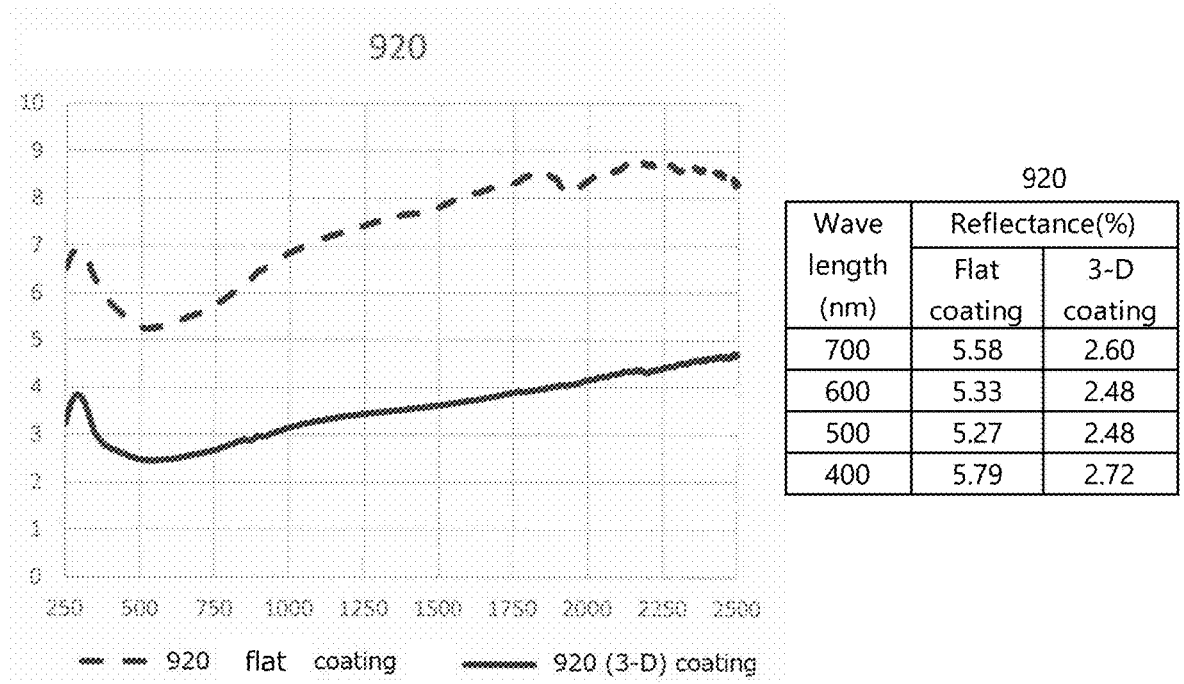
FIG. 6A is a graph showing the spectral reflectance (%) in the short wavelength region (250 to 2500 nm) of the coating (920 three-dimensional coating and 920 flat coating) produced under the conditions of Example 1 and Example 21.
Figure 6B:
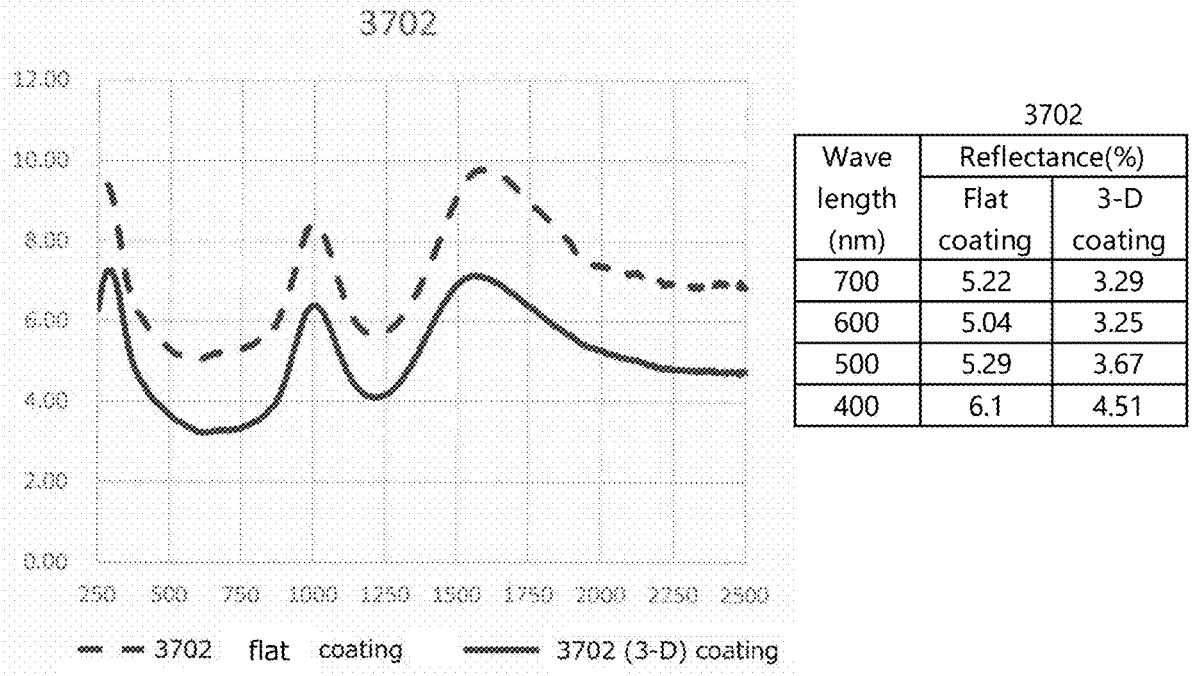
FIG. 6B is a graph showing the spectral reflectance (%) in the short wavelength region (250 to 2500 nm) of the coating (3702 three-dimensional coating and 3702 flat coating).
Figure 7A:
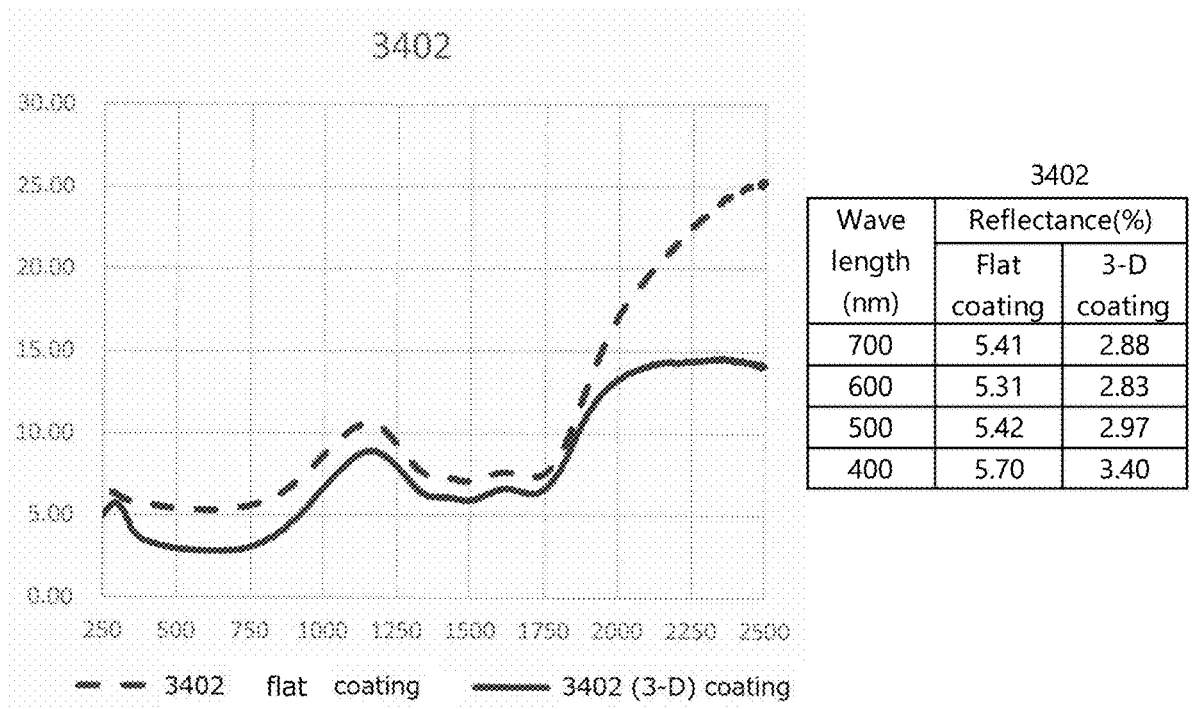
FIG. 7A is a graph showing the spectral reflectance (%) in the short wavelength region (250 to 2500 nm) of the coatings (3402 three-dimensional coating and 3402 flat coating) produced under each of the conditions of Example 12 and Example 23.
Figure 7B:
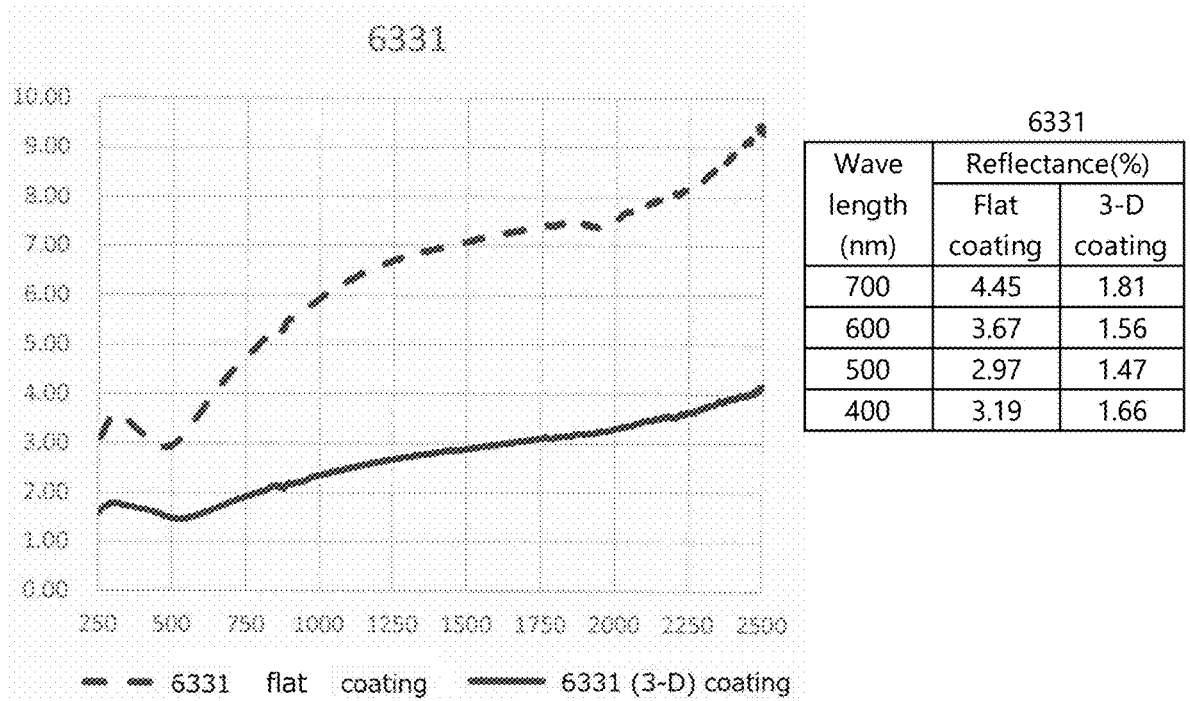
FIG. 7B is a graph showing the spectral reflectance (%) in the short wavelength region (250 to 2500 nm) of the coatings (6331 three-dimensional coating and 6331 flat coating) prepared under the conditions of Example 13 and Example 24.
Figure 8A:
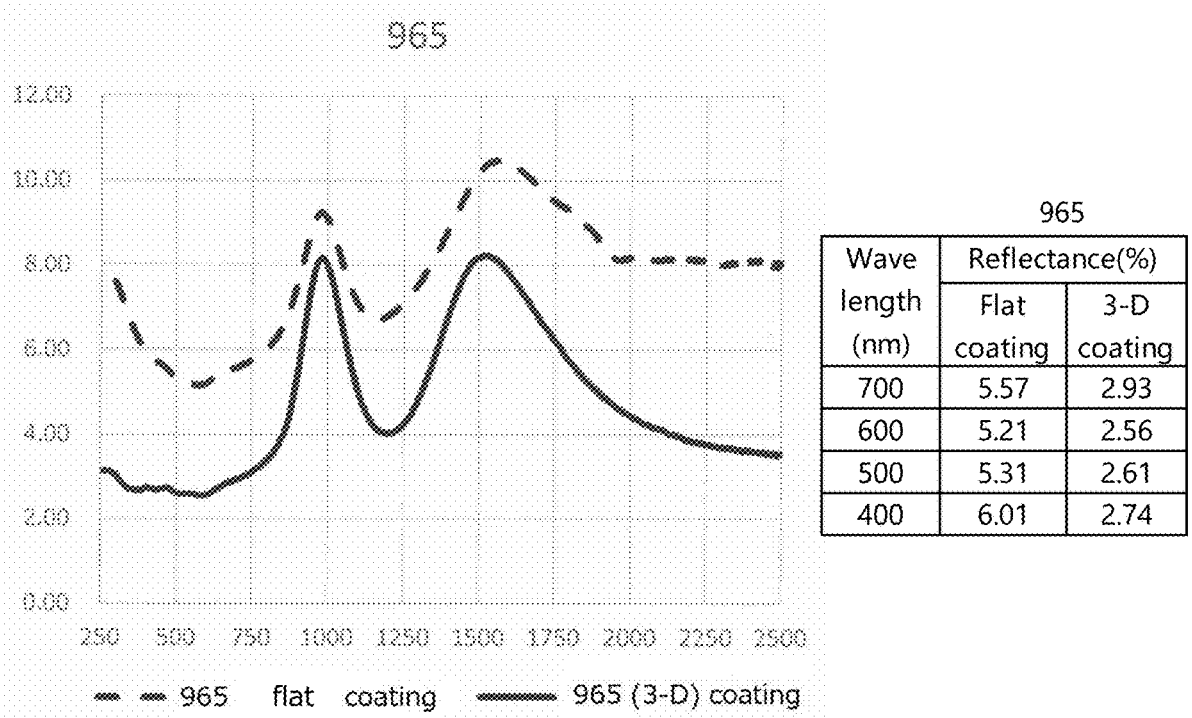
FIG. 8A is a graph showing the spectral reflectance (%) in the short wavelength region (250 to 2500 nm) of the coatings (965 three-dimensional coating, 965 flat coating) produced under the conditions of Example 14 and Example 25.
Figure 8B:
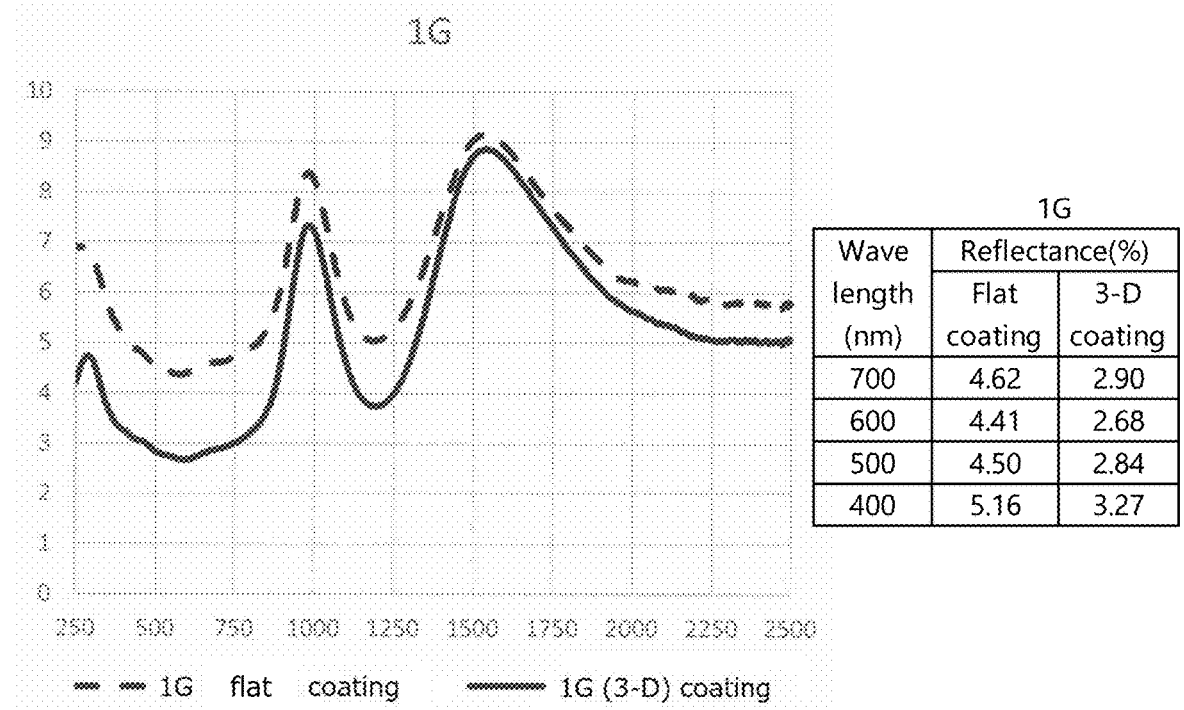
FIG. 8B is a graph showing the spectral reflectance (%) in the short wavelength region (250 to 2500 nm) of the coatings (1G three-dimensional coating and 1G flat coating) produced under the conditions of Example 15 and Example 26.
Figure 9A:
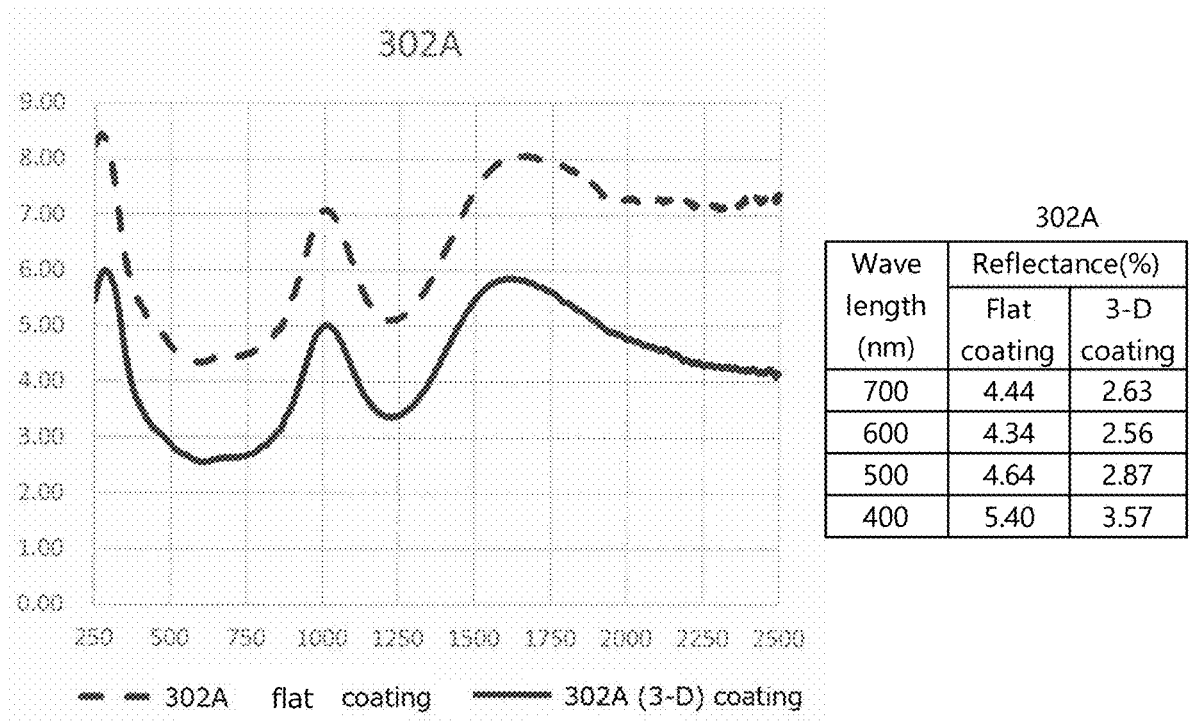
FIG. 9A is graphs showing the spectral reflectance (%) in the short wavelength region (250 to 2500 nm) of the coatings (302A three-dimensional coating and 302A flat coating) produced under each of the conditions of Example 16 and Example 27.
Figure 9B:
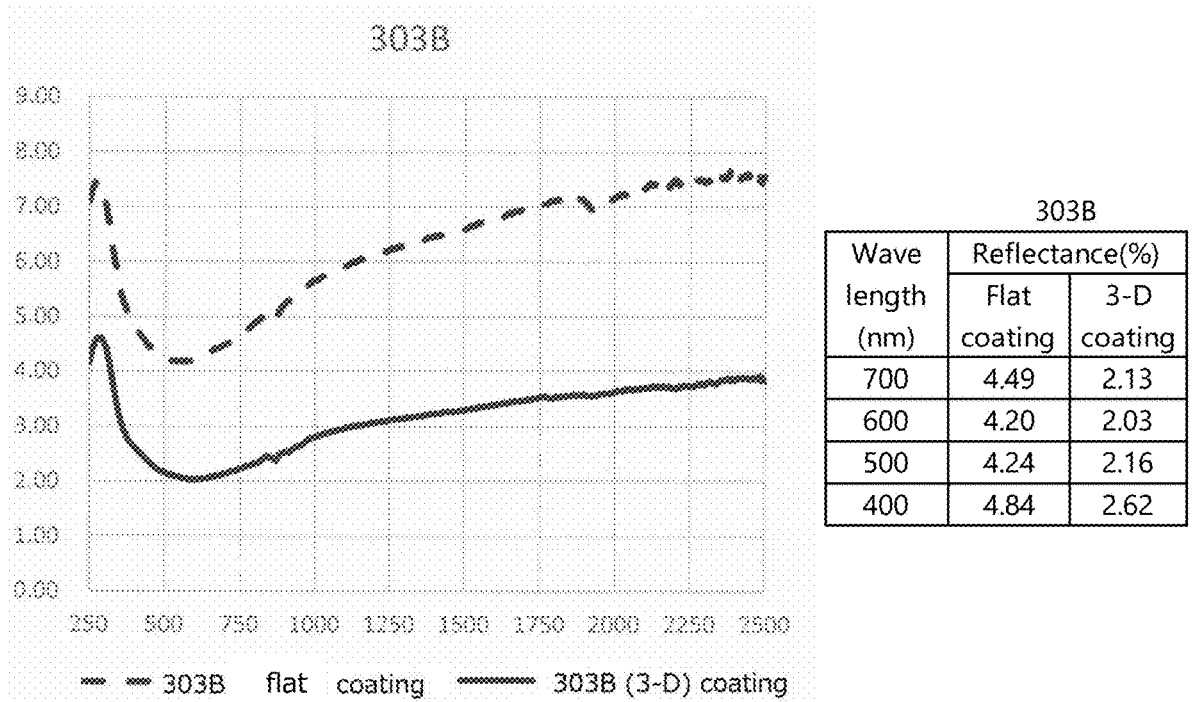
FIG. 9B is graphs showing the spectral reflectance (%) in the short wavelength region (250 to 2500 nm) of the coatings (303B three-dimensional coating and 303B flat coating) produced under each of the conditions of Example 17 and Example 28.
Figure 10A:
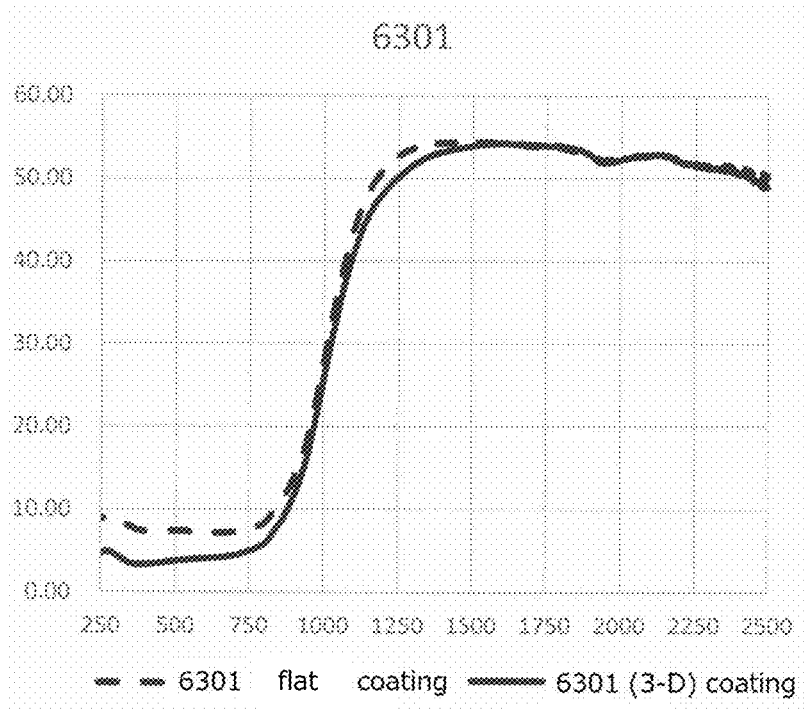
FIG. 10A is graphs showing the spectral reflectance (%) in the short wavelength region (250 to 2500 nm) of the coatings (6301 three-dimensional coating and 6301 flat coating) produced under each of the conditions of Example 18 and Example 29.
Figure 10B:
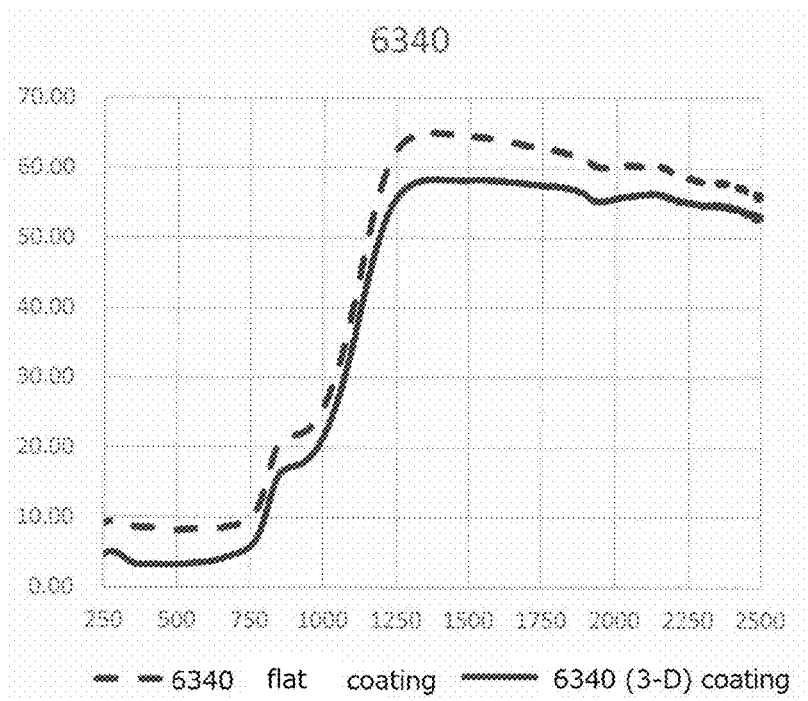
FIG. 10B is graphs showing the spectral reflectance (%) in the short wavelength region (250 to 2500 nm) of the coatings (6340 three-dimensional coating and 6340 flat coating) produced under each of the conditions of Example 19 and Example 30.
Figure 11:
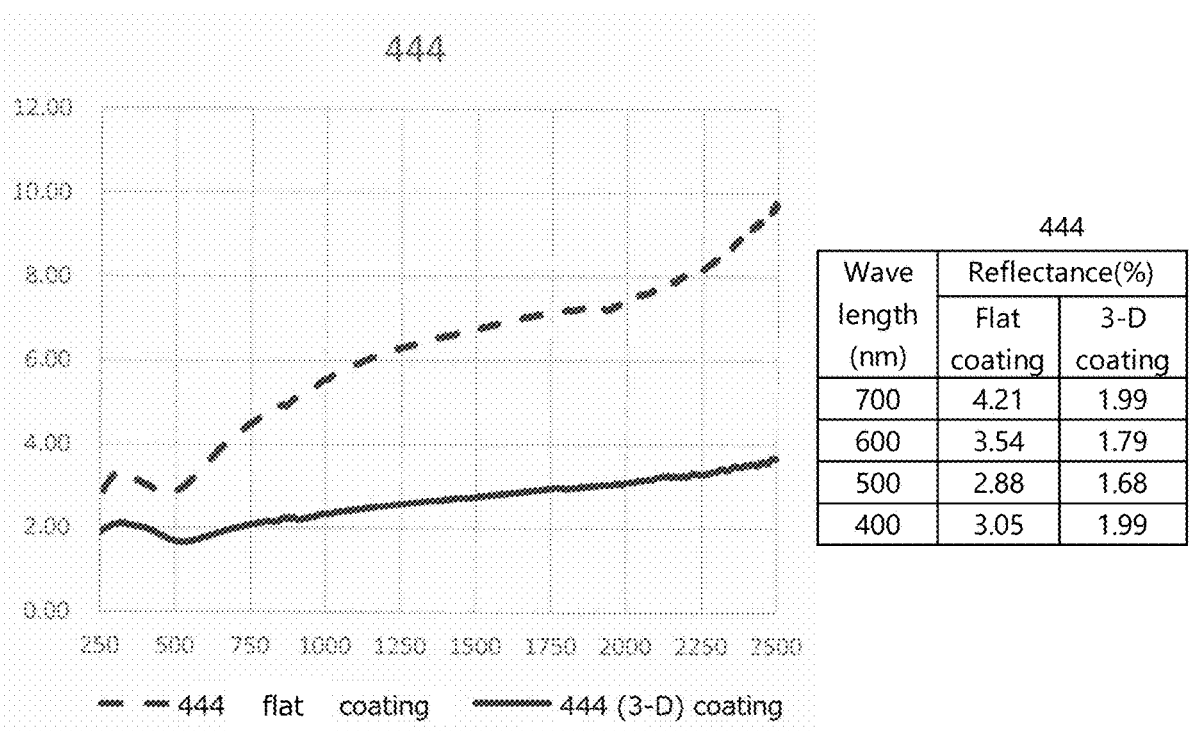
FIG. 11 is a graph showing spectral reflectance (%) in the short wavelength region (250 to 2500 nm) of the coatings (444 three-dimensional coating and 444 flat coating) produced under each of the conditions of Example 20 and Example 31.

FIG. 6A is a graph showing spectral reflectances (%) of the coatings (920 three-dimensional coating, 920 flat coating) produced under the conditions of Example 1 and Example 21, and FIG. 6B is a graph showing the spectral reflectances (%) of the coatings (3702 three-dimensional coating, 3702 flat coating) produced under the conditions of Example 11 and Example 22 in the short wavelength region (250 to 2500 nm). FIG. 7A is a graph showing spectral reflectances (%) of the coatings (3402 three-dimensional coating, 3402 flat coating) produced under each of the conditions of Example 12 and Example 23, and FIG. 7B is a graph showing spectral reflectances (%) of the coatings (6331 three-dimensional coating, 6331 flat coating) produced under the conditions of Example 13 and Example 24 in the short wavelength region (250 to 2500 nm). FIG. 8A is a graph showing spectral reflectances (%) of the coatings (965 three-dimensional coating, 965 flat coating) produced under the conditions of Example 14 and Example 25, and FIG. 8B is a graph showing spectral reflectances (%) of the coatings (1G three-dimensional coating, 1G flat coating) (250 to 2500 nm) produced under the conditions of Example 15 and Example 26 in the short wavelength region (250 to 2500 nm). FIG. 9A is a graph showing spectral reflectances (%) of the coatings (302A three-dimensional coating, 302A flat coating) produced under each of the conditions of Example 16 and Example 27, and FIG. 9B is a graph showing spectral reflectances (%) of the coating (303B three-dimensional coating, 303B flat coating) in the short wavelength region (250 to 2500 nm). FIG. 10A is a graph showing spectral reflectances (%) of the coatings (6301 three-dimensional coating, 6301 flat coating) produced under each of the conditions of Example 18 and Example 29, and FIG. 10B is a graph showing spectral reflectances (%) of the coatings (6340 three-dimensional coating, 6340 flat coating) in the short wavelength region (250 to 2500 nm). FIG. 11 is a graph showing the spectral reflectances (%) in the short wavelength region (250 to 2500 nm) of the coatings (444 three-dimensional coating, 444 flat coating) produced under the respective conditions of Example 20 and Example 31. In each of the graphs, FIG. 6A to FIG. 11, the horizontal axis represents the wavelength (nm) and the vertical axis represents the spectral reflectance (%). In each graph, the broken line shows a flat coating and the solid line shows a three-dimensional coating. In the right side table of each graph, the spectral reflectance of each of the coatings is shown at wavelengths of 400, 500, 600 and 700 nm.

For all of the three-dimensional coatings, a tendency was found that the spectral reflectance was lower than that of the flat coating, that is, the spectral absorptance was higher. In addition, the spectral reflectance of each of the three-dimensional coatings was less than 5% at a wavelength of 400 to 700 nm in the visible light region. On the other hand, in the case of a flat coating, while only the three coatings "6331", "303B" and "444" show spectral reflectance of less than 5% at a wavelength of 400 to 700 nm, other flat coatings exhibited a spectral reflectance of 5% or more at any wavelength in the above wavelength range.

Next, a part of the various coatings shown in FIG. 6A to FIG. 11 will be described by comparing the spectral reflectance and the thermal emittance in the long wavelength region.

Figure 12A:
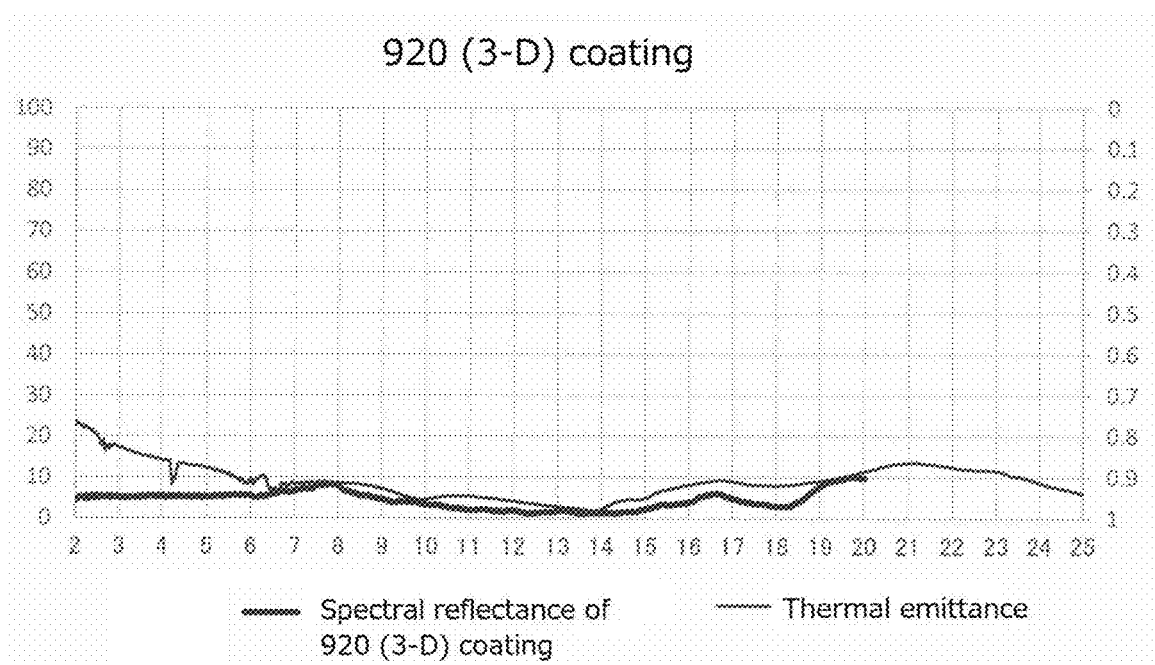
FIG. 12A is a graph showing the spectral reflectance (%) and the thermal emittance in the long wavelength region of the coatings (920 three-dimensional coating) produced under the condition of Example 1.
Figure 12B:
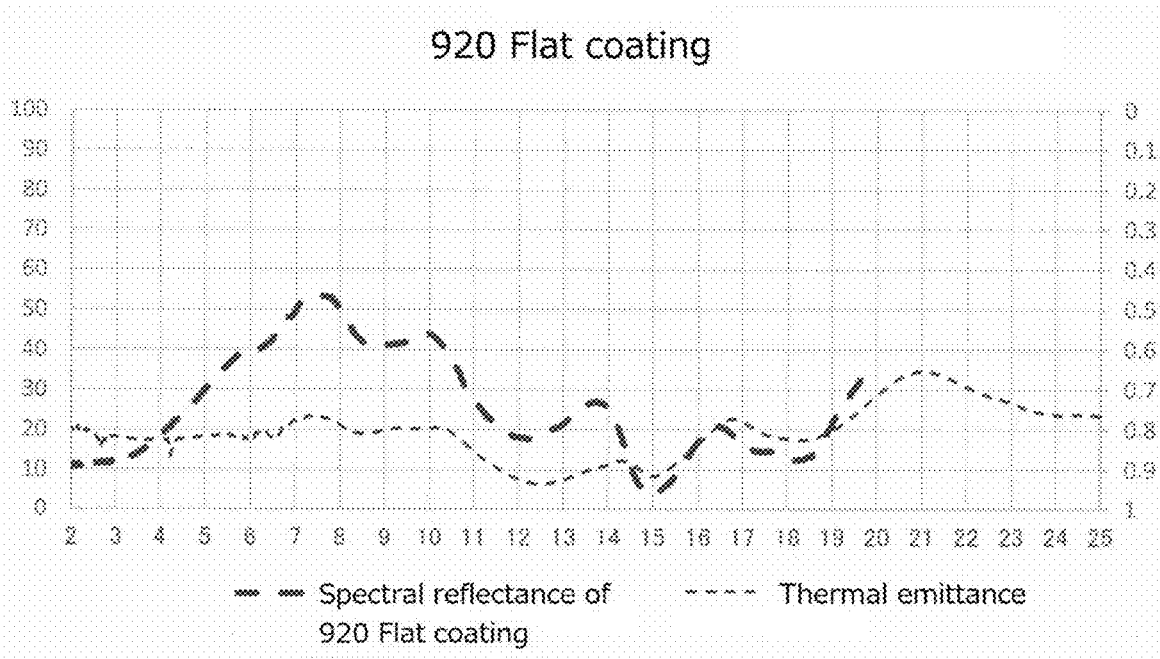
FIG. 12B is a graph showing the spectral reflectance (%) and the thermal emittance in the long wavelength region of the coatings (920 flat coating) produced under the condition of Example 21.
Figure 13A:
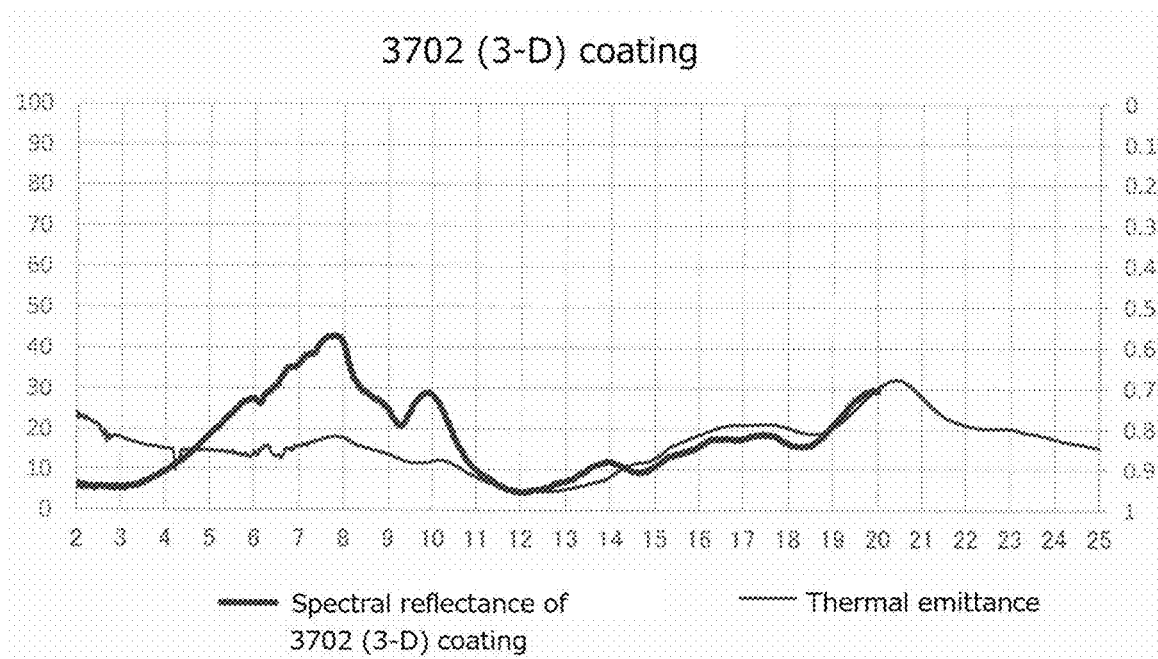
FIG. 13A is a graph showing the spectral reflectance (%) and the thermal emittance in the long wavelength region of the coatings (3702 three-dimensional coating) produced under the condition of Example 11.
Figure 13B:
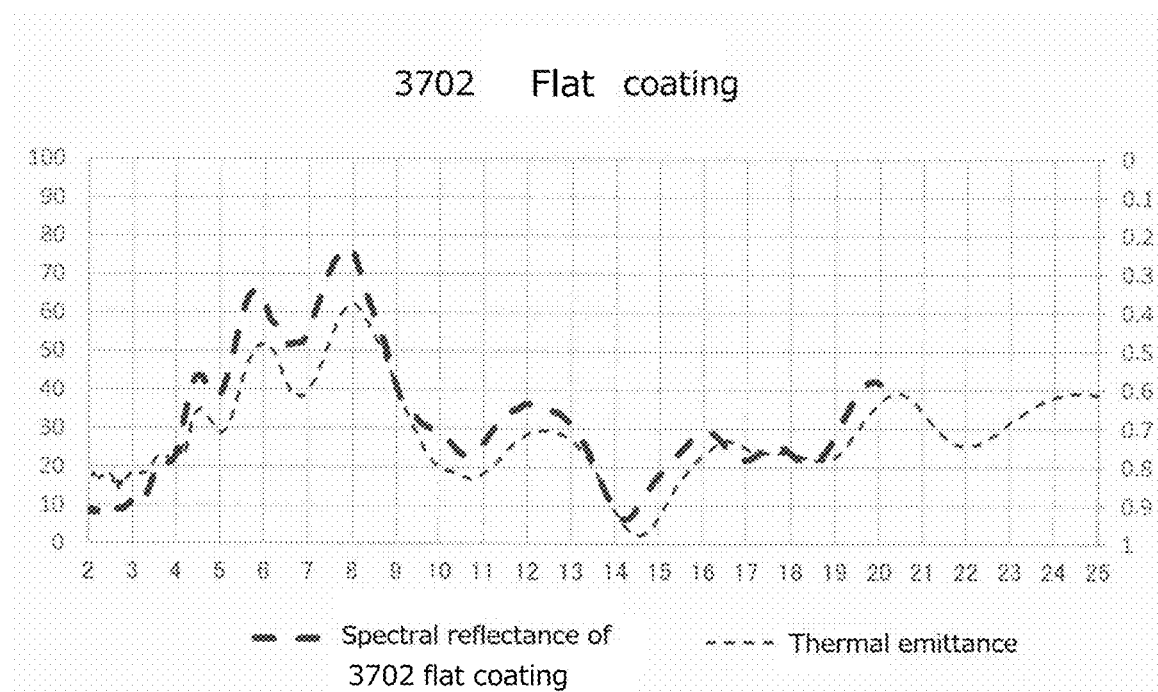
FIG. 13B is a graph showing the spectral reflectance (%) and the thermal emittance in the long wavelength region of the coatings (3702 flat coating) produced under the condition of Example 22.
Figure 14A:
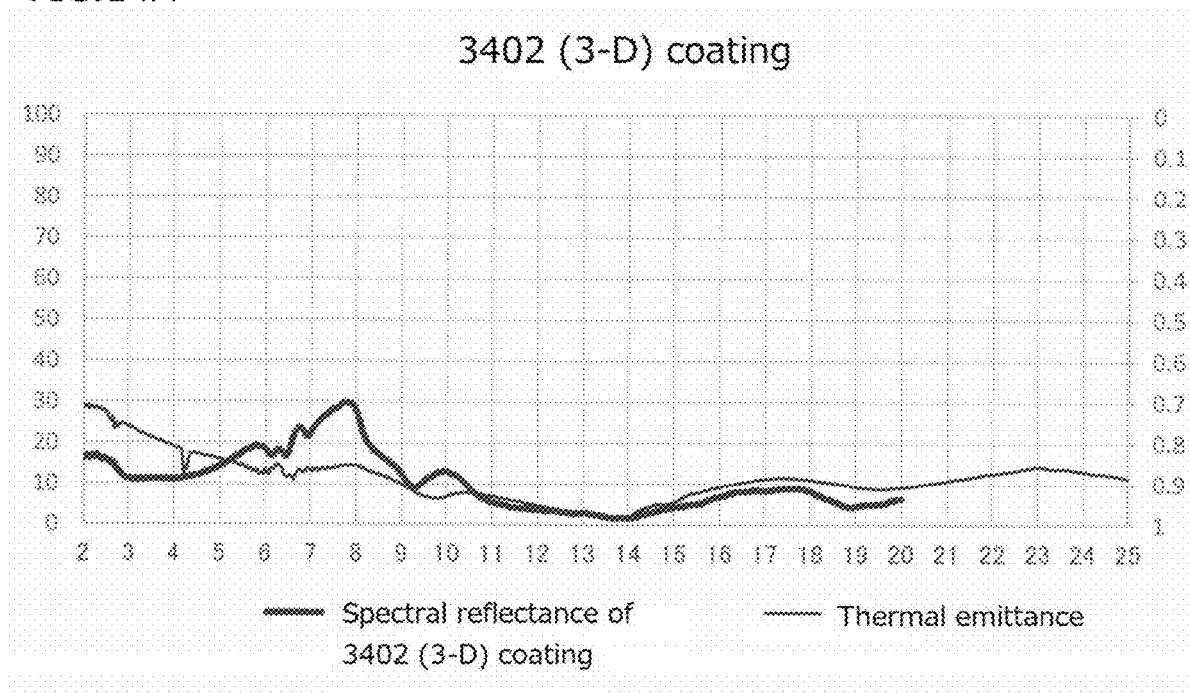
FIG. 14A is a graph showing the spectral reflectance (%) and the thermal emittance in the long wavelength region of the coatings (3402 three-dimensional coating) produced under the condition of Example 12.
Figure 14B:
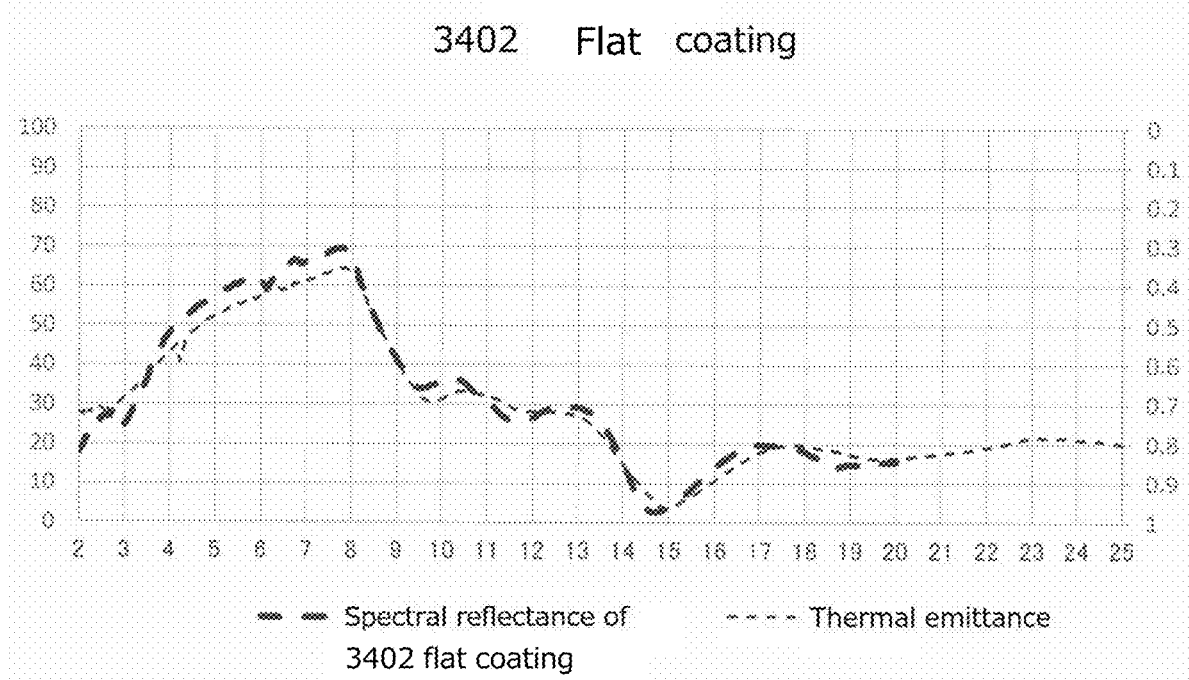
FIG. 14B is a graph showing the spectral reflectance (%) and the thermal emittance in the long wavelength region of the coatings (3402 flat coating) produced under the condition of Example 23.
Figure 15A:
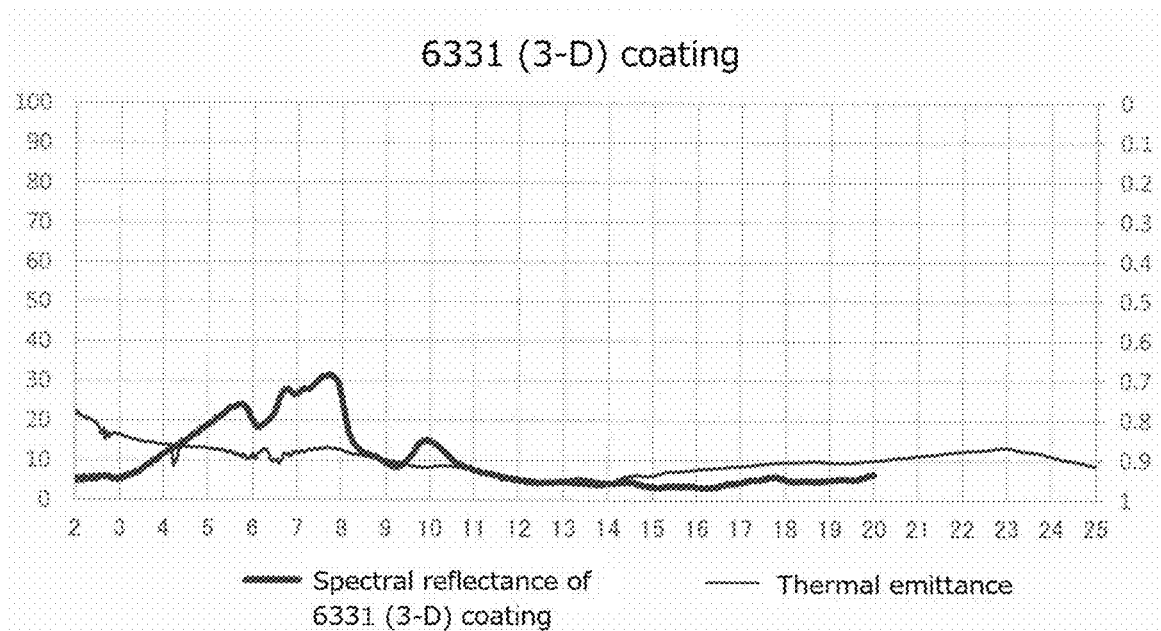
FIG. 15A is a graph showing the spectral reflectance (%) and the thermal emittance in the long wavelength region of the coating (6331 three-dimensional coating) produced under the condition of Example 13.
Figure 15B:
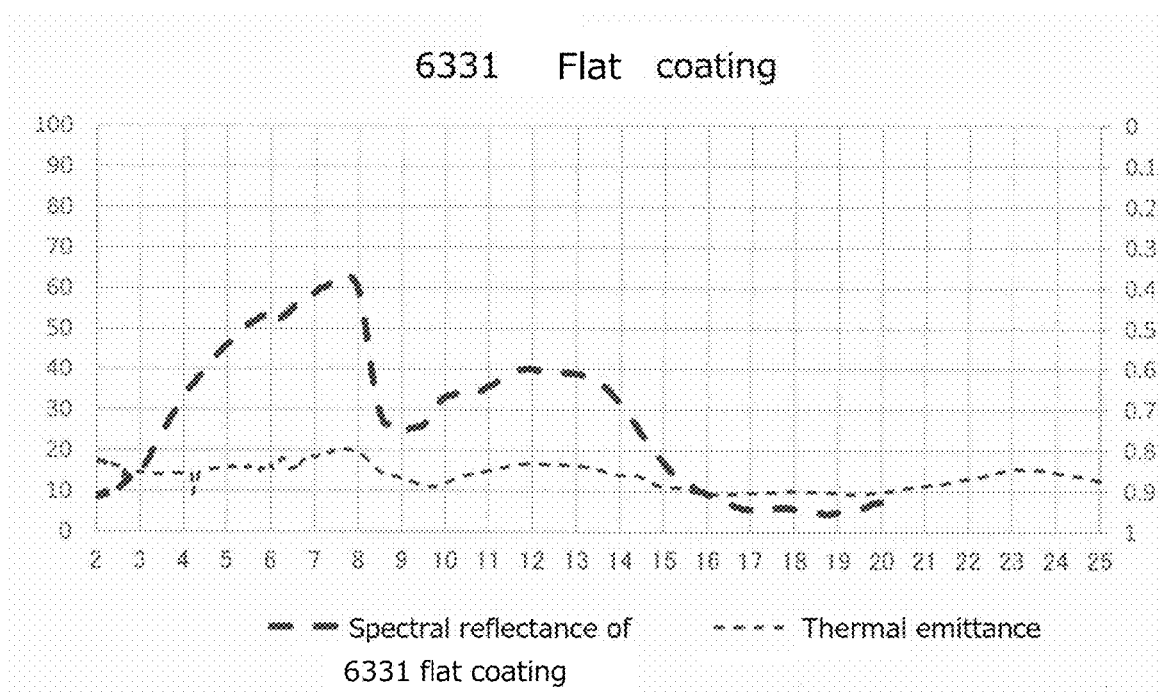
FIG. 15B is a graph showing the spectral reflectance (%) and the thermal emittance in the long wavelength region of the coating (6331 flat coating) produced under the condition of Example 24.
Figure 16A:
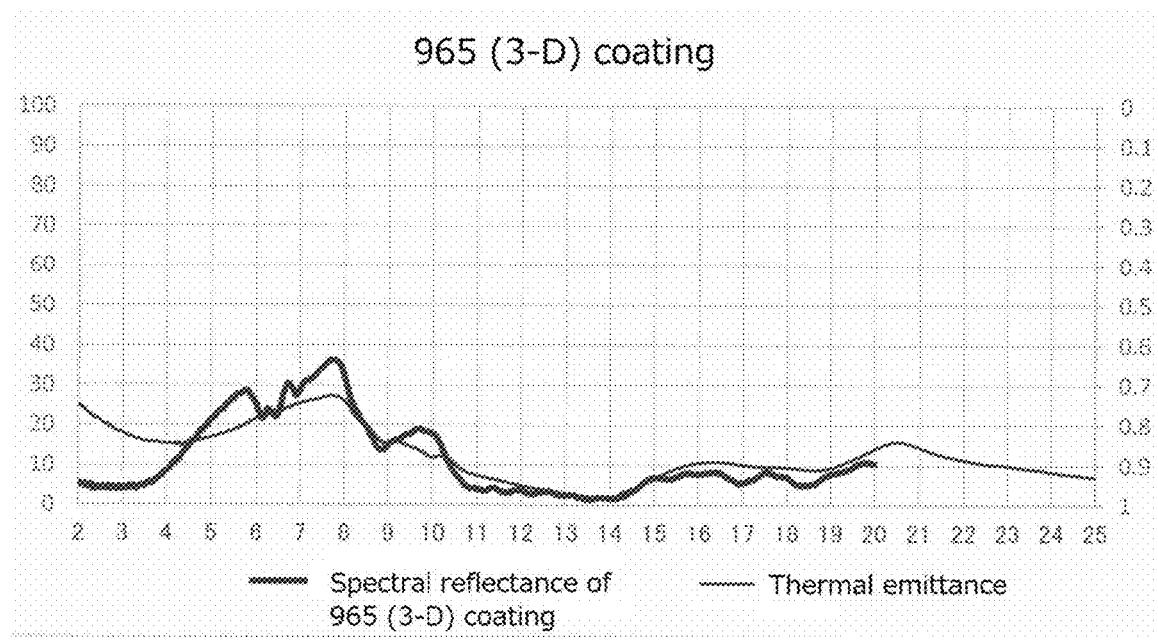
FIG. 16A is a graph showing the spectral reflectance (%) and the thermal emittance in the long wavelength region of the coating (965 three-dimensional coating) produced under the condition of Example 14.
Figure 16B:
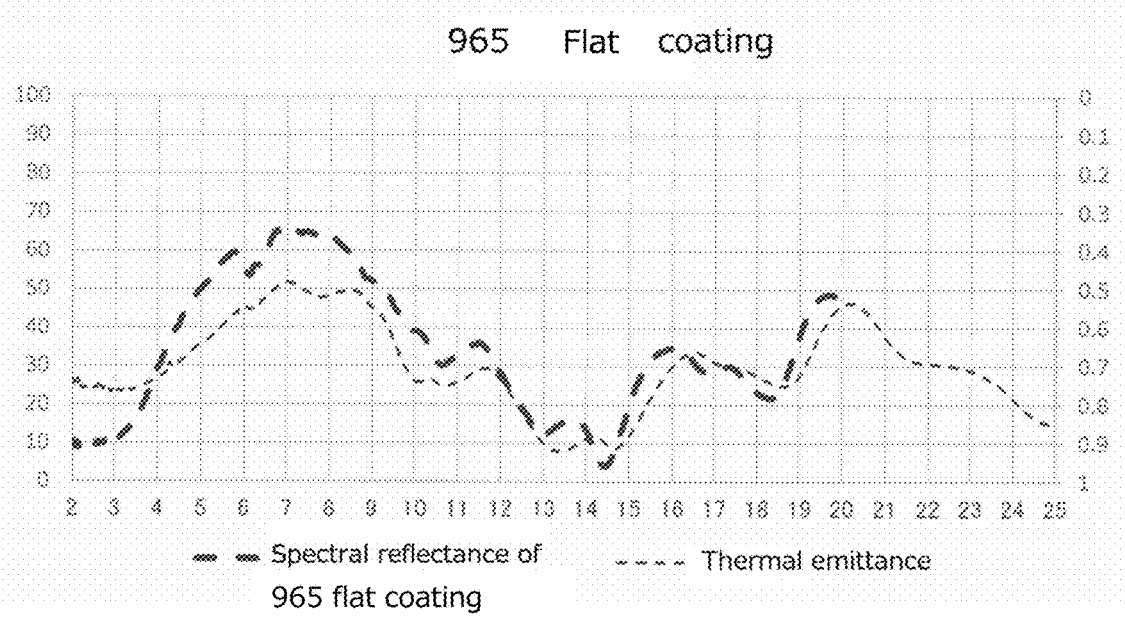
FIG. 16B is a graph showing the spectral reflectance (%) and the thermal emittance in the long wavelength region of the coating (965 flat coating) produced under the condition of Example 25.
Figure 17A:
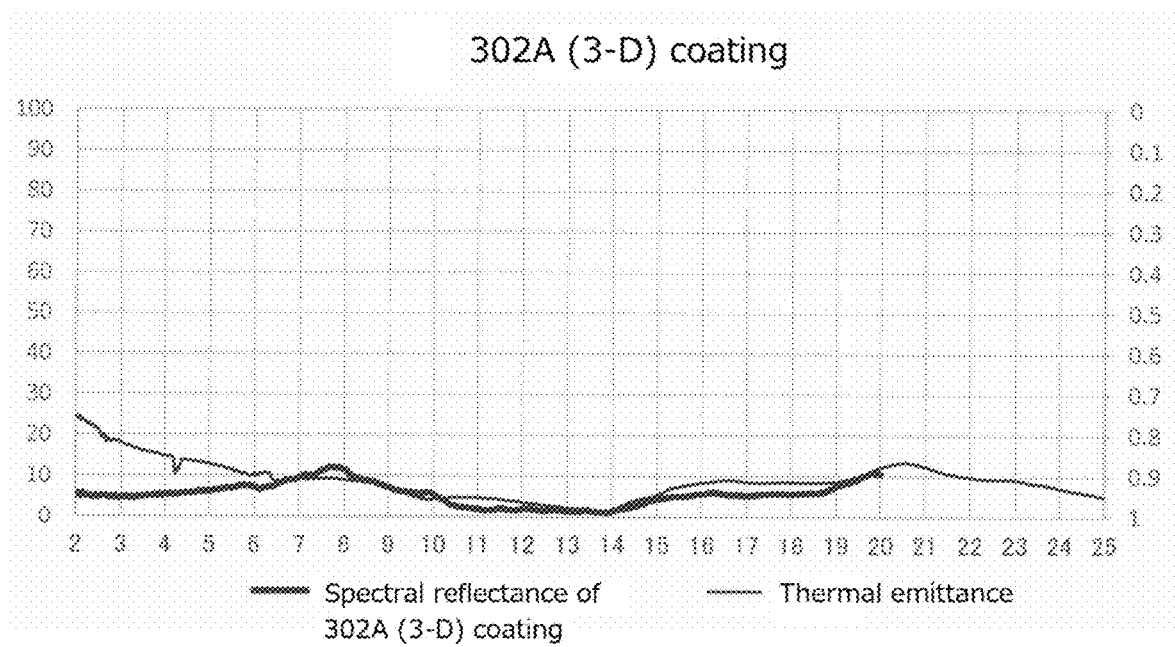
FIG. 17A is a graph showing the spectral reflectance (%) and the thermal emissivity in the long wavelength region of the coating (302A three-dimensional coating, 302A flat coating) produced under the conditions of Example 16 and Example 27.
Figure 17B:
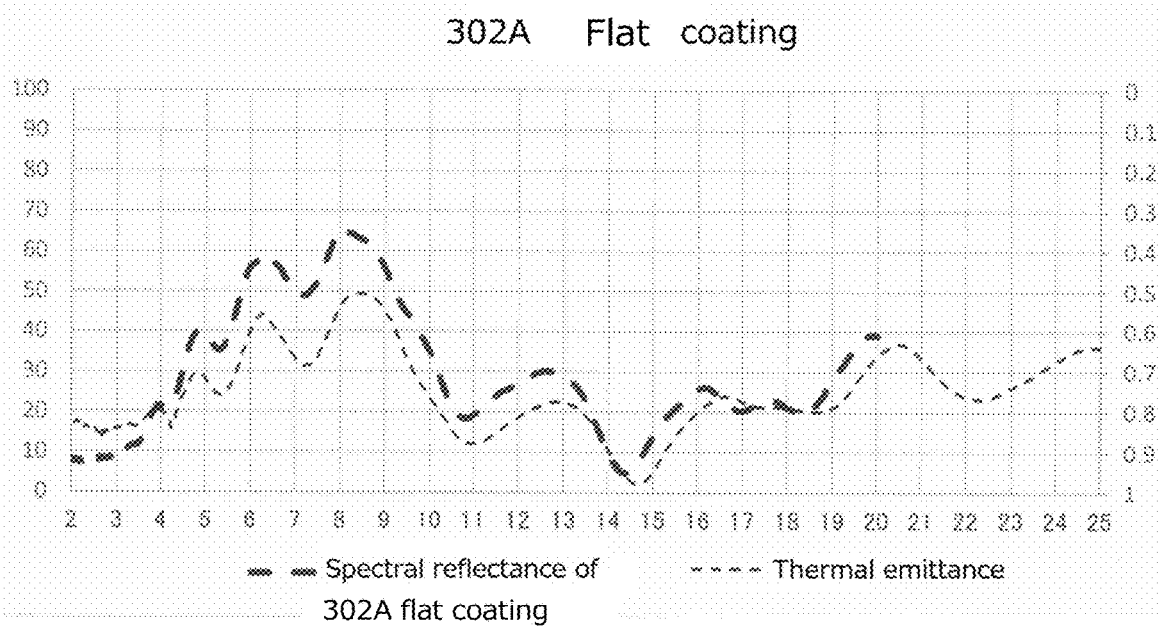
FIG. 17B is a graph showing the spectral reflectance (%) and the thermal emittance in the long wavelength region of the coating (302A three-dimensional coating) produced under the condition of Example 16.
Figure 18A:
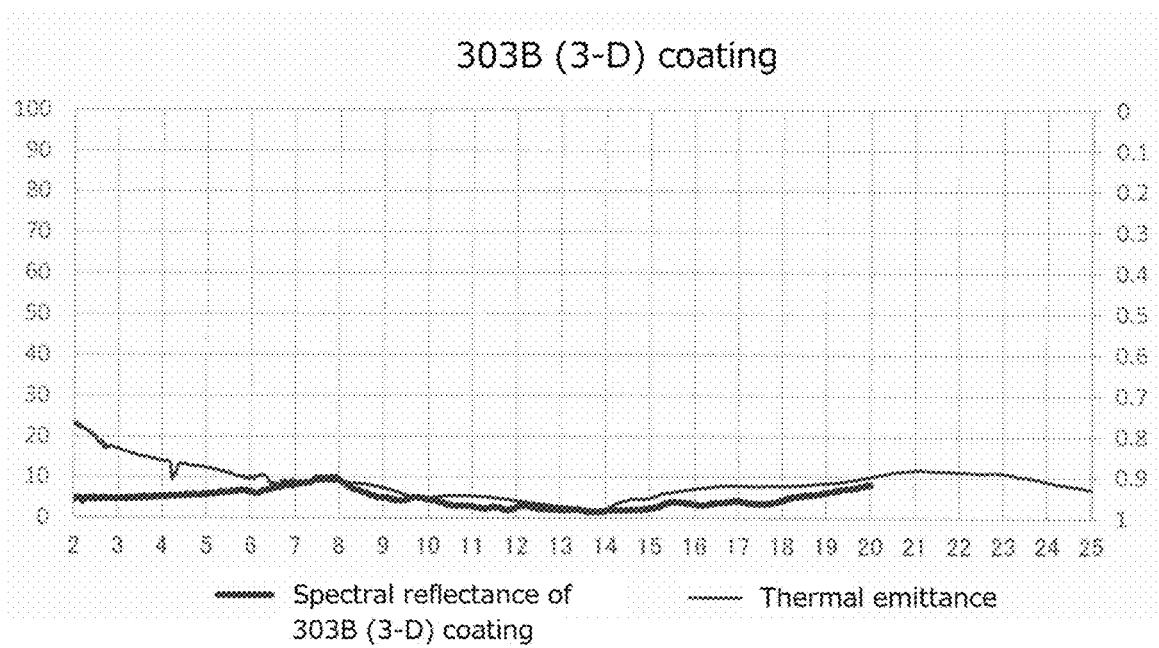
FIG. 18A is a graph showing the spectral reflectance (%) and the thermal emittance in the long wavelength region of the coating (303B three-dimensional coating) produced under the condition of Example 17.
Figure 18B:
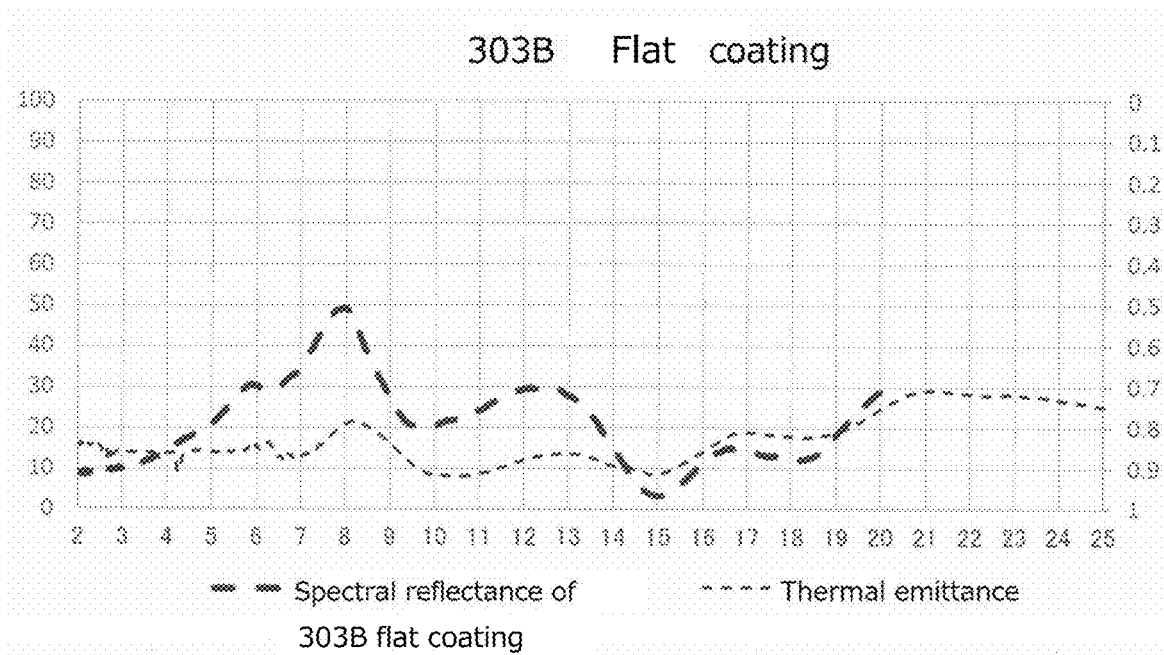
FIG. 18B is a graph showing the spectral reflectance (%) and the thermal emittance in the long wavelength region of the coating (303B flat coating) produced under the condition of Example 28.

FIG. 12A is a graph showing the spectral reflectance (%) and the thermal emittance in the long wavelength region, of the coating (920 three-dimensional coating) produced under the condition of Example 1, and FIG. 12B is a graph showing the spectral reflectance (%) and the thermal emittance in the long wavelength region, of the coating (920 flat coating) produced under the condition of Example 21. FIG. 13A is a graph showing the spectral reflectance (%) and the thermal emittance in the long wavelength region of the coating (3702 three-dimensional coating) produced under the condition of Example 11, and FIG. 13B is a graph showing the spectral reflectance (%) and the thermal emittance in the long wavelength region of the coating (3702 flat coating) produced under the condition of Example 22. FIG. 14A is a graph showing the spectral reflectance (%) and the thermal emittance in the long wavelength region of the coating (3402 three-dimensional coating) produced under the condition of Example 12, and FIG. 14B is a graph showing the spectral reflectance (%) and the thermal emittance in the long wavelength region of the coating (3402 flat coating) produced under the condition of Example 23. FIG. 15A is a graph showing the spectral reflectance (%) and the thermal emittance in the long wavelength region of the coating (6331 stereo coating) produced under the condition of Example 13, and FIG. 15B is a graph showing the spectral reflectance (%) and the thermal emittance in the long wavelength region of the coating (6331 flat coating) produced under the condition of Example 24. FIG. 16A is a graph showing the spectral reflectance (%) and the thermal emittance in the long wavelength region of the coating (965 stereo coating) produced under the condition of Example 14, and FIG. 16B is a graph showing the spectral reflectance (%) and the thermal emittance in the long wavelength region of the coating (965 flat coating) produced under the condition of Example 25. FIG. 17A is a graph showing the spectral reflectance (%) and the thermal emittance in the long wavelength region of the coating (302A three-dimensional coating) produced under the condition of Example 16, and FIG. 17B is a graph showing the spectral reflectance (%) and the thermal emittance in the long wavelength region of the coating (302A flat coating) produced under the condition of Example 27. FIG. 18A is a graph showing the spectral reflectance (%) and the thermal emittance in the long wavelength region of the coating (303B three-dimensional coating) produced under the condition of Example 17, and FIG. 18B is a graph showing the spectral reflectance (%) and the thermal emittance in the long wavelength region of the coating (303B flat coating) produced under the condition of Example 28. In each of the graphs, FIG. 12A to FIG. 18B, the horizontal axis indicates the wavelength (μm), the vertical axis on the left side indicates spectral reflectance, and the right side on the vertical axis indicates the thermal emittance (1 at the bottom and 0 at the top). The thermal emittance is indicated by the ratio of the thermal emittance of a perfect black body to 1. In each graph, thick lines indicate spectral reflectance and thin lines indicate thermal emittance, respectively. The three-dimensional coating is indicated by a solid line on the graph and the flat coating is indicated by a broken line on the graph.

Here, "thermal emittance" means that the absorbed solar heat is radiated outward as an electromagnetic wave. For this reason, thermal emittance is preferably close to zero. In general, the perfect black body which is used for comparison in the measurement of spectral absorptance and thermal emittance has a spectral absorptance of 100%, which corresponds to thermal emittance of 1. From the Kirchhoff's law, it is considered that spectral absorptance=thermal emittance, thus the perfect blackbody has 100% spectral absorptance, and all of the absorbed light is thermally radiated to the outside. The ideal coating has a light absorptance of 100% as perfect black body and does not radiate heat to the outward direction (the thermal emittance is zero). Such a coating does not actually exist, but the greater the difference between the spectral absorptance and the thermal emittance, the better the coating. In contrast, an undesirable coating has a high the thermal emittance although its spectral absorptance is low and the heat absorbing power is weak, since it is difficult to absorb sunlight but easy to radiate the heat brought by the absorbed light. From the relationship between the spectral absorptance and the thermal emittance in FIG. 12A to FIG. 18B, firstly, all of the three-dimensional coatings showed a tendency that the spectral reflectance is lower than that of the flat coating, that is, the spectral absorptance thereof is higher than that of the flat coating. Also, at wavelengths of 2 to 5 µm at which the thermal radiation energy of solar heat at the high temperature is the largest, it is recognized that the value of the spectral reflectance of each of the three-dimensional coatings is lower than the value of the thermal emittance as compared with the flat coating. That is, although the three-dimensional coating has a low spectral reflectance (high spectral absorptance), heat radiation was suppressed. According to Kirchhoff's law, considering spectral absorptance theoretically equals to thermal emittance as described above, the perfect black body has a spectral absorptance of 100% (spectral reflectance 0%) and a thermal emittance of 1, it is found that the equilibrium can be changed by the structure of the coatings etc. Ideally, the absorber of solar heat power generation has a low spectral reflectance (high spectral absorptance) and low thermal emittance, and it is desirable to have a difference between these numerical values as much as possible. As the characteristics of each of the "920", "303B" and "302A" flat coatings, the spectral reflectance is slightly lower than the thermal emittance at the wavelength of 2 to 5 µm, the same or slightly higher. However, in the wavelength region of 5 µm or more, the spectral reflectance remarkably tended to exceed the thermal emittance. That is, it is considered that the heat radiation becomes high while the spectral reflectance is high (spectral absorptance is poor), which is unsuitable for solar heat power generation. On the contrary, in the three-dimensional coatings of "920", "303B" and "302A", it was confirmed that the spectral absorptance exceeded the thermal emittance. Even the other coatings (for example, "965", "6331" or "3402") also showed the same tendency by forming the three-dimensional coating.

From the above, the particles of metal oxide mainly containing two or more metals selected from Mn, Cr, Cu, Zr, Mo, Fe, Co and Bi and the titanium oxide partially or entirely covering the particle surface, and having a three-dimensional coating in which the Ra of the coating surface is 1.0 µm or more and the ratio of the area of the network of the composite particles to the area of the plane coating is 7 or more, was observed to have low spectral reflectances and good characteristics with low thermal emittance relative to spectral absorptance.

Example 32

An absorber coating having a three-layer structure including a base coating was produced by the following method. First, 3 g of an organotitanium polymer (product number: B-10, tetra-n-butoxytitanium polymer) manufactured by Nippon Soda Co., Ltd., 6 g of isopropyl diglycol (iPDG) manufactured by Nippon Nyukazai Co., Ltd. and 1.85 g of 1-butanol (first grade reagent) manufactured by Wako Pure Chemical Industries were combined and mixed by ultrasonic irradiation for 15 minutes in an ultrasonic washer (trade name: Bransonic) manufactured by Branson. To this mixture, 9 g of powdered metal oxide "3250" was added, and ultrasonic waves were irradiated again for 15 minutes to prepare a mixture. Next, this mixture was poured into a spray device (spray gun made by HARDER & STEENBECK, 0.4 mm nozzle, trade name: Colani) and sprayed on SUS304 at room temperature or heated, at a pressure of 0.2 MPa for 2 seconds to form a coating. Immediately after coating, the substrate was placed on a heated heater at 400° C., and allowed to stand for 30 minutes. The coating thickness of the base coating was about 8 µm.

Next, as raw materials of the absorber coating, 61.85 g of TTiP and 43.58 g of AcAc were mixed so that TTiP: AcAc=1:2 (molar ratio) and the mixture was heated at about 80° C. for 6 hours to react TTiP and AcAc by heating. Next, 306.963 g of 2-propanol was added to the reaction mixture to dilute the reaction solution. Subsequently, 12.5 g of powdered metal oxide "3250" was mixed and sonicated for 30 minutes. Next, the mixture (also referred to as a mixed solution) obtained in the above steps was placed in a spray device (spray gun made by HARDER & STEENBECK, 0.4 mm nozzle, trade name: Colani). The coating was formed by spraying on the base coating for 110 seconds while moving the spray from one end side to the other end side of the base coating maintaining the temperature of 350° C. The pressure during spraying was 0.2 MPa. The titanium precursor as the raw material of the absorber coating solidifies the metal oxide particles upon thermal decomposition and crystallization on the heater and pores are produced by evaporation of the organic solvent. This process was repeated several times while maintaining the temperature of the substrate surface. Next, a mixed solution of 20.83 g of TEOS and 63.36 g of ethanol, a mixture of 7.41 g of HA, 63.36 g of ethanol, and 9.01 g of ion exchanged water were mixed and stood at 40° C. The mixture was diluted with ethanol to give a solid content concentration of 0.6% by mass, and the solution was put in the same spray apparatus as above. At room temperature, the solution was sprayed onto the light absorbing coating for 2 seconds, the substrate was immediately heated to 400° C. and kept for 1 hour to form a porous silica coating on the absorber coating. The thickness of the absorber coating was approximately 17 µm, the thickness of the porous silica coating was approximately 5 to 10 nm, and the thickness of the three-layer structure comprising the base coating, the absorber coating and the porous silica coating was approximately 25 µm. Eight samples (3×3 cm square) (hereinafter referred to as "samples 1 to 8") were prepared for the thermal durability test below.

Figure 19A:
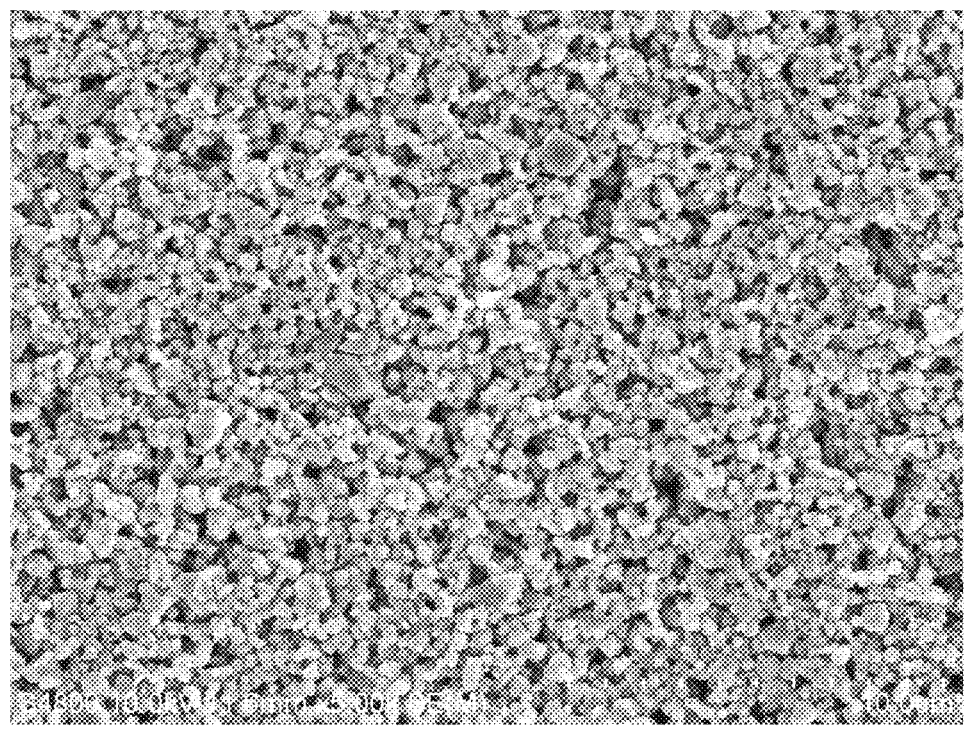
FIG. 19A shows an SEM photograph of the morphology of the base coating (3250 flat coating) prepared in Example 32.
Figure 19B:
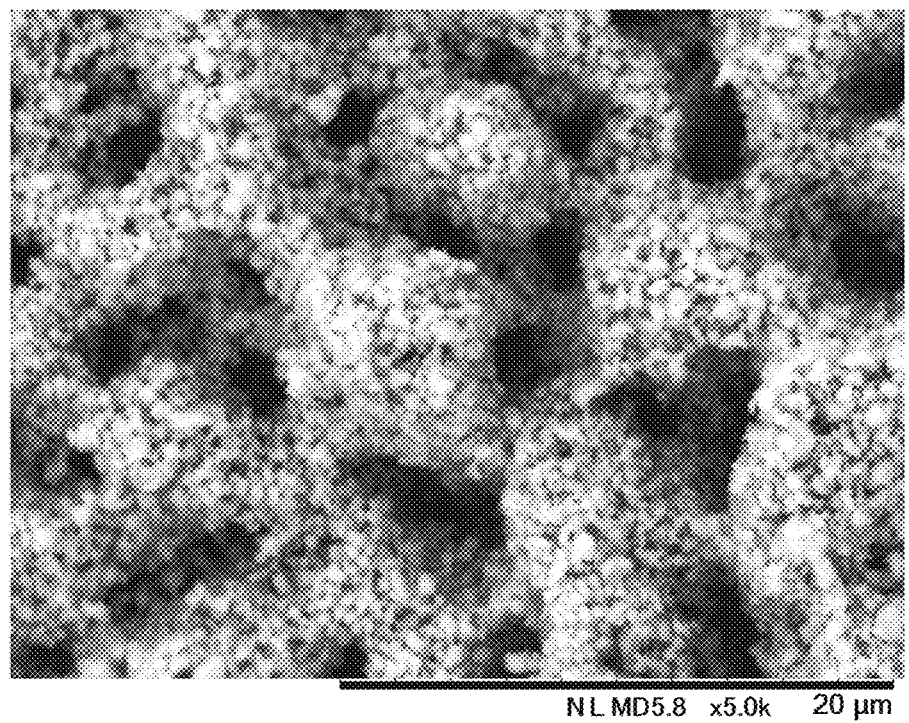
FIG. 19B shows an SEM photograph of the morphology of the absorber coating (3250 three-dimensional coating) prepared in Example 32.

Table 6 shows various characteristics resulting from the morphology of the coating prepared in Example 32. FIG. 19A and FIG. 19B show SEM photographs comparing the respective forms of the base coating and the absorber coating. It can be seen that pores are formed by repeating spray coating of the absorber coating on the base coating surface.

TABLE 6

|  | Example 32 | |
| --- | --- | --- |
|  | Absorber coating (3250 (3-D)) | Base coating (3250 flat) |
| Network area ($\mu m^2$) | 157770.473 | 49327.742 |
| Projected area ($\mu m^2$) | 15649.473 | 15491.455 |
| Network area/Projected area | 10.0815 | 3.1842 |
| Ra ($\mu m$) | 3.019 | 0.357 |
| Rz ($\mu m$) | 37.575 | 10.11 |

Figure 20:
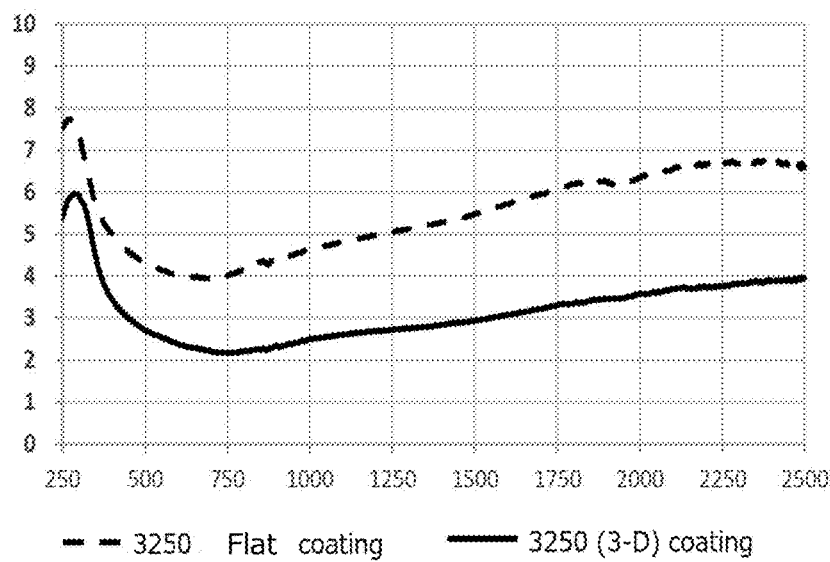
FIG. 20 is a graph showing spectral reflectance (%) in the short wavelength region (250 to 2500 nm) of the coatings (3250 flat coating, and 3250 three-dimensional coating) prepared under the conditions of Example 32.

FIG. 20 is a graph showing the spectral reflectance (%) in the short wavelength region (250 to 2500 nm) of the absorber coating (3250 (3-D) coating) and the base coating (3250 flat coating) prepared in Example 32. It is similar to the results shown in FIGS. 6 to 11 that the three-dimensional coating has a lower spectral reflectance than the flat coating, that is, the spectral absorptance is higher. In addition, the spectral reflectance of the three-dimensional coating was as small as less than 4% at a wavelength of 400 to 700 nm in the visible light region, showing a significant difference as compared with the flat coating.

Figure 21A:
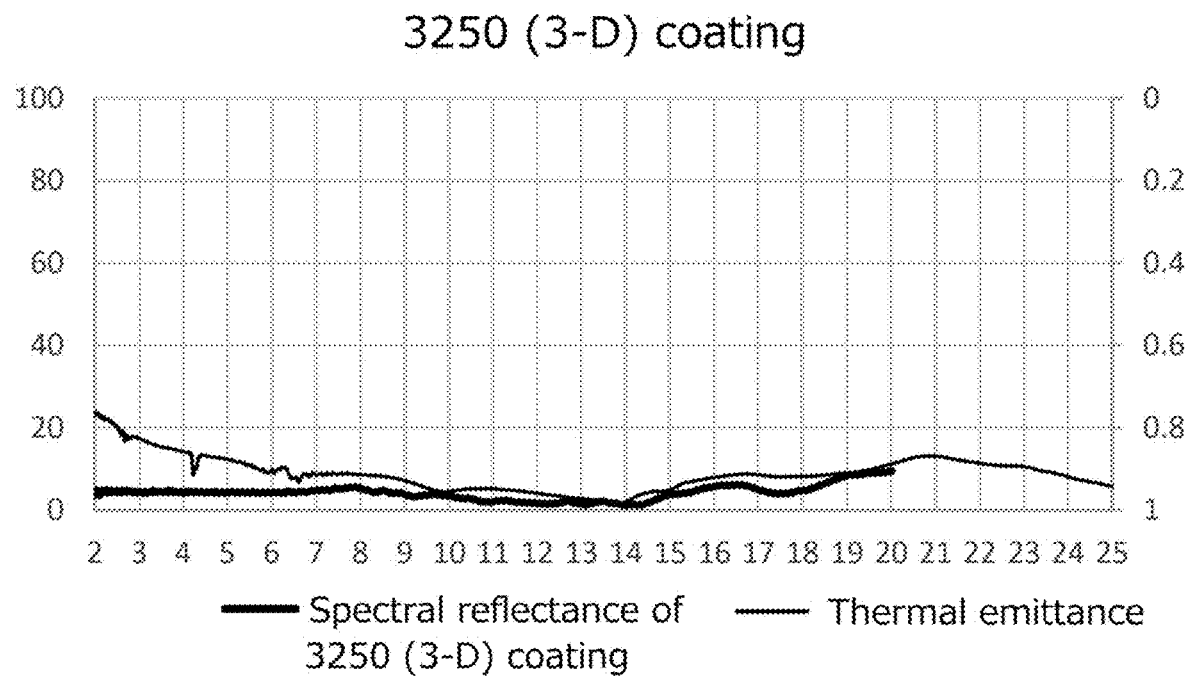
FIG. 21A is a graph showing spectral reflectance (%) and thermal emittance in the long wavelength region of the coating (3250 three-dimensional coating) prepared under the condition of Example 32.
Figure 21B:
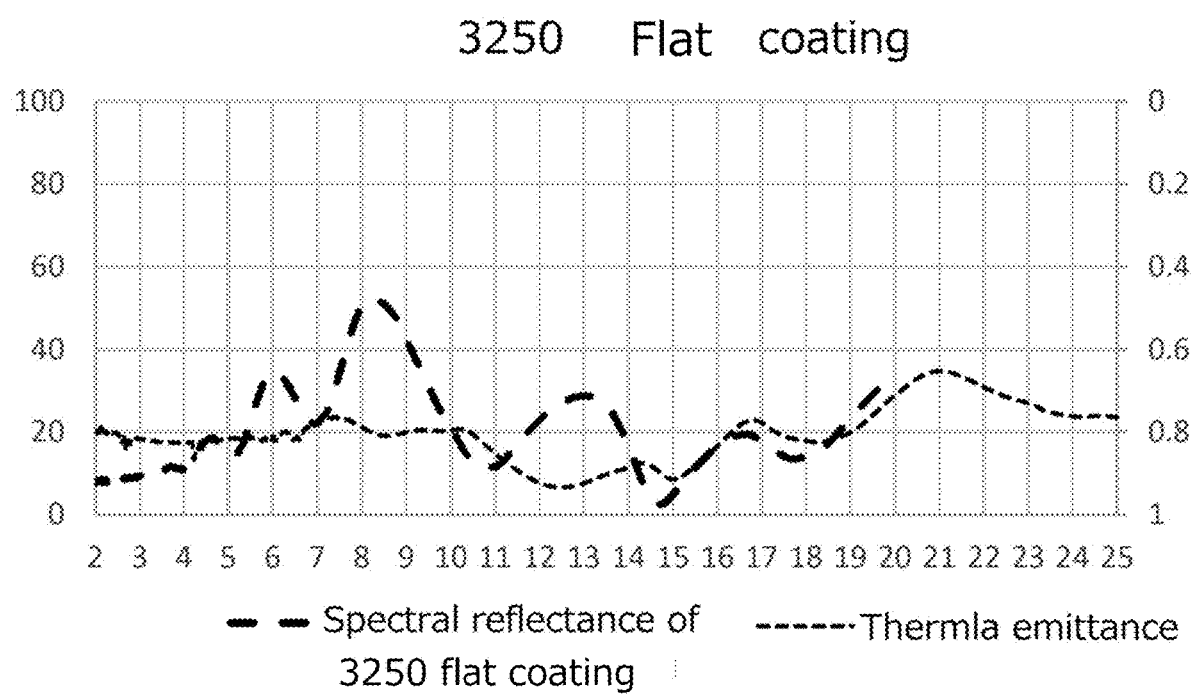
FIG. 21B is a graph showing spectral reflectance (%) and thermal emissivity in the long wavelength region of the coating (3250 flat coating) prepared under the condition of Example 32.

FIG. 21A is a graph showing the spectral reflectance (%) and the thermal emittance in the long wavelength region (2 to 25 $\mu m$) of the absorber coating (3250 3-D coating) prepared in Example 32. FIG. 21B is a graph showing the spectral reflectance (%) and the thermal emittance in the long wavelength region (2 to 25 $\mu m$) of the base coating (3250 flat coating) prepared in Example 32. With respect to the 3250 flat coating, the spectral reflectance slightly falls below the thermal emittance in the wavelength region from 2 to 5 nm, but in the region of 5 nm or more, the spectral reflectance tends to be significantly higher than the thermal emittance in the specific wavelength region. On the contrary, with respect to the 3250 three-dimensional coating, it was confirmed that the value of the spectral reflectance is small and the spectral absorptance exceeds the thermal emittance.

4. Thermal Durability Test and Spectral Absorptance Measurement (Thermal Durability Test Method)

Thermal durability test and spectral absorptance measurement were conducted at Australian National University (ANU). The thermal durability tests were carried out for 10 hours, 20 hours or 100 hours at temperatures of 600° C., 750° C. or 850° C., respectively, and compared with coatings prepared using Pyromark 2500 which is a highly heat-resistant silicone coating material as a control. Thermal durability test was carried out by placing the sample (coating+substrate) in a programmed muffle furnace. Temperature up and down were set at 3° C./min. In this test, the time to reach the target temperature and return to room temperature is added to the thermal durability test time.

(Results)

Figure 22:
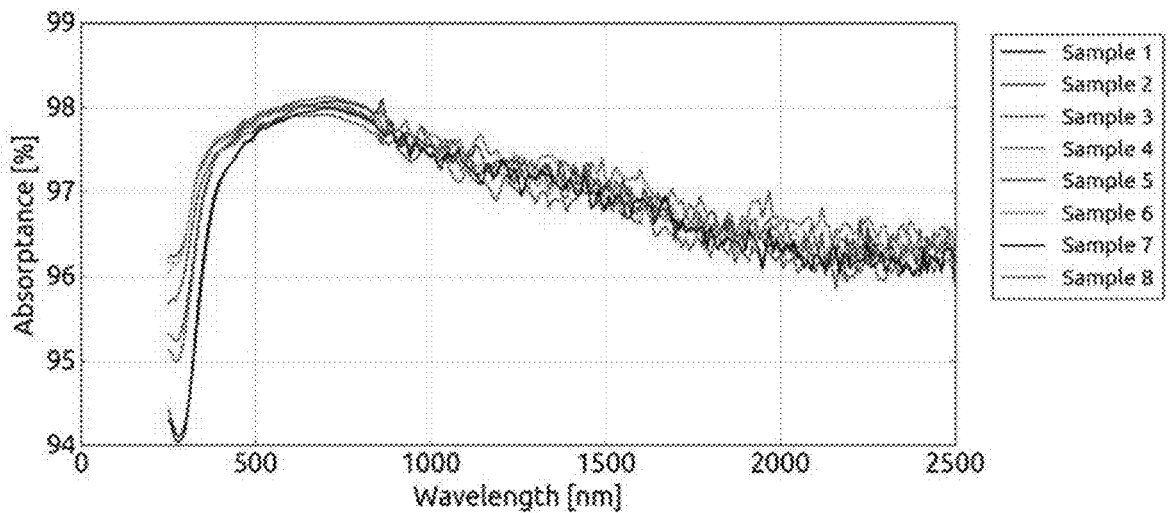
FIG. 22 shows the measurement results of the light absorption before the heat resistance test for the eight samples (triple-layered coating) prepared in Example 32.
Figure 23:
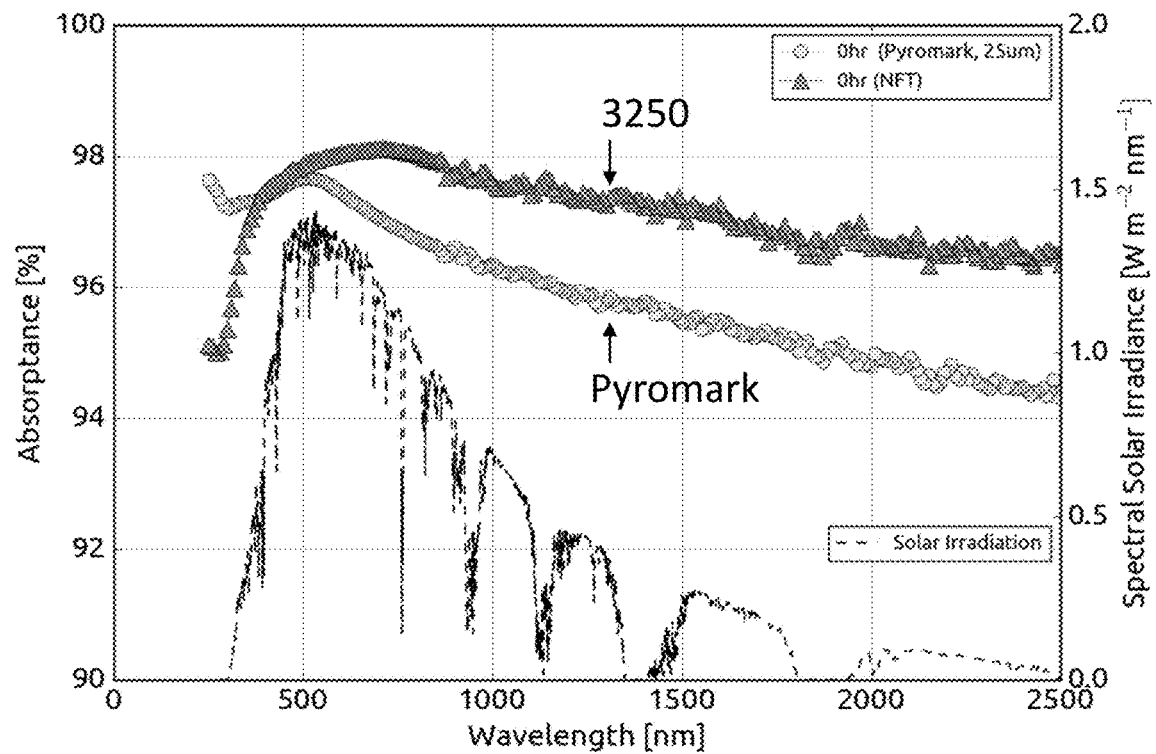
FIG. 23 shows the measurement results of the spectral absorptance before the heat resistance test for the coating (sample 8) prepared in Example 32.

The results of the above tests are shown in FIGS. 22 to 26 and Tables 7 to 9. FIG. 22 is the spectral absorptance measurement data of the eight samples (three-layer coating) prepared in Example 32 before the thermal durability test. In the wavelength region of 400 to 2500 nm, the solar-weighted absorptance of these eight samples was extremely uniform as 96.91%±0.08%. FIG. 23 shows the results of comparing the spectral absorptance before the thermal durability test of the three-layer coating (Sample 8) (indicated as 3250 in the drawing) prepared in Example 32 with the control coating (indicated as Pyromark in the drawing). The horizontal axis represents the measurement wavelength, and the vertical axis represents the spectral absorptance. Each coating is coated on the same heat-resistant stainless-steel substrate (SS 253 MA). As shown in FIG. 23, it can be seen that the three-layer coating prepared in Example 32 has a much higher absorptance than that of the control coating.

Figure 24:
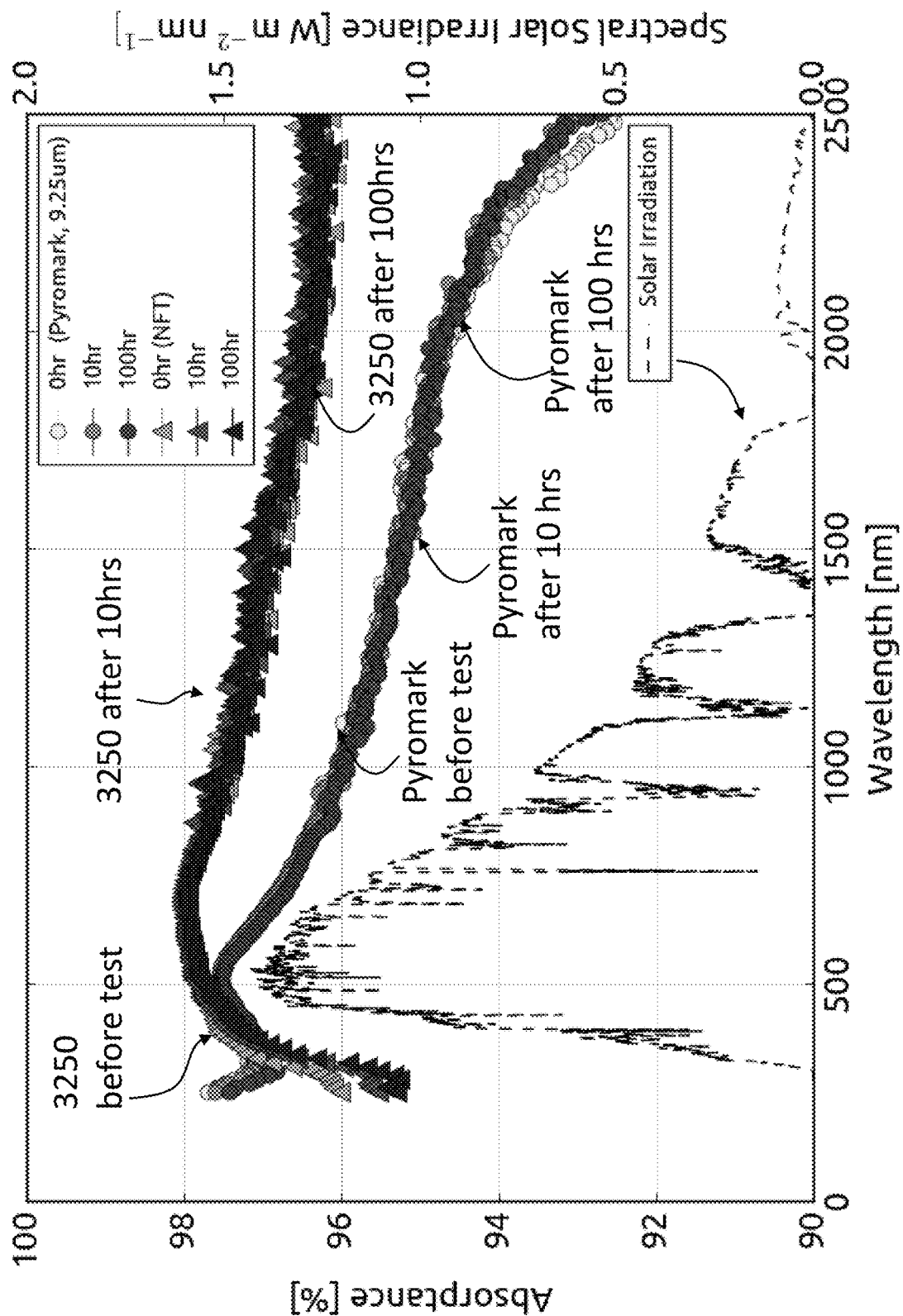
FIG. 24 shows the measurement results of light absorption before and after the heat resistance test at 600° C. for the membranes (Samples 6 and 7) prepared in Example 32.

FIG. 24 shows the spectral absorptances before and after the thermal durability test at 600° C. for the three-layer coating (indicated as 3250 in the drawing) prepared in Example 32. Samples 7 and 6 were subjected to the thermal durability test at 600° C. for 10 hours and 100 hours, respectively. Sample 6 was performed at first a thermal durability test for 10 hours at 600° C., measured the spectral absorptance at room temperature, and then heated at 600° C. for 90 hours to measure the spectral absorptance again. As reference, the solar radiation intensity is shown on the second axes. Sample 7 and sample 6 also showed a lower spectral absorptance in the lower wavelength range than the control coating (Pyromark). However, in the wavelength region more than 700 nm, the spectral absorptance was higher than that of the control coating, and moreover, there was almost no reduction in the spectral absorptance. The solar-weighted absorptance was shown in Table 7. In all cases, there was only a slight decrease (within ±0.1%) compared to the spectral absorptance before the thermal durability test within the range of expected uncertainty. As a result, Samples 7 and 6 can be said to have very high thermal durability in the test at 600° C.

TABLE 7

| | Solar-weighted absorptance: $\alpha$(%) (change from 0) | | |
| --- | --- | --- | --- |
| Time (hours) | Pyromark (thickness 9.25 $\mu m$) | 3250 (sample 7) | 3250 (sample 6) |
| 0 | 96.55 | 96.84 | 96.94 |
| 10 | 96.54 | 96.74 (−0.10) | 96.96 (+0.02) |
| 100 | 96.45 | — | 96.89 (−0.05) |

Figure 25:
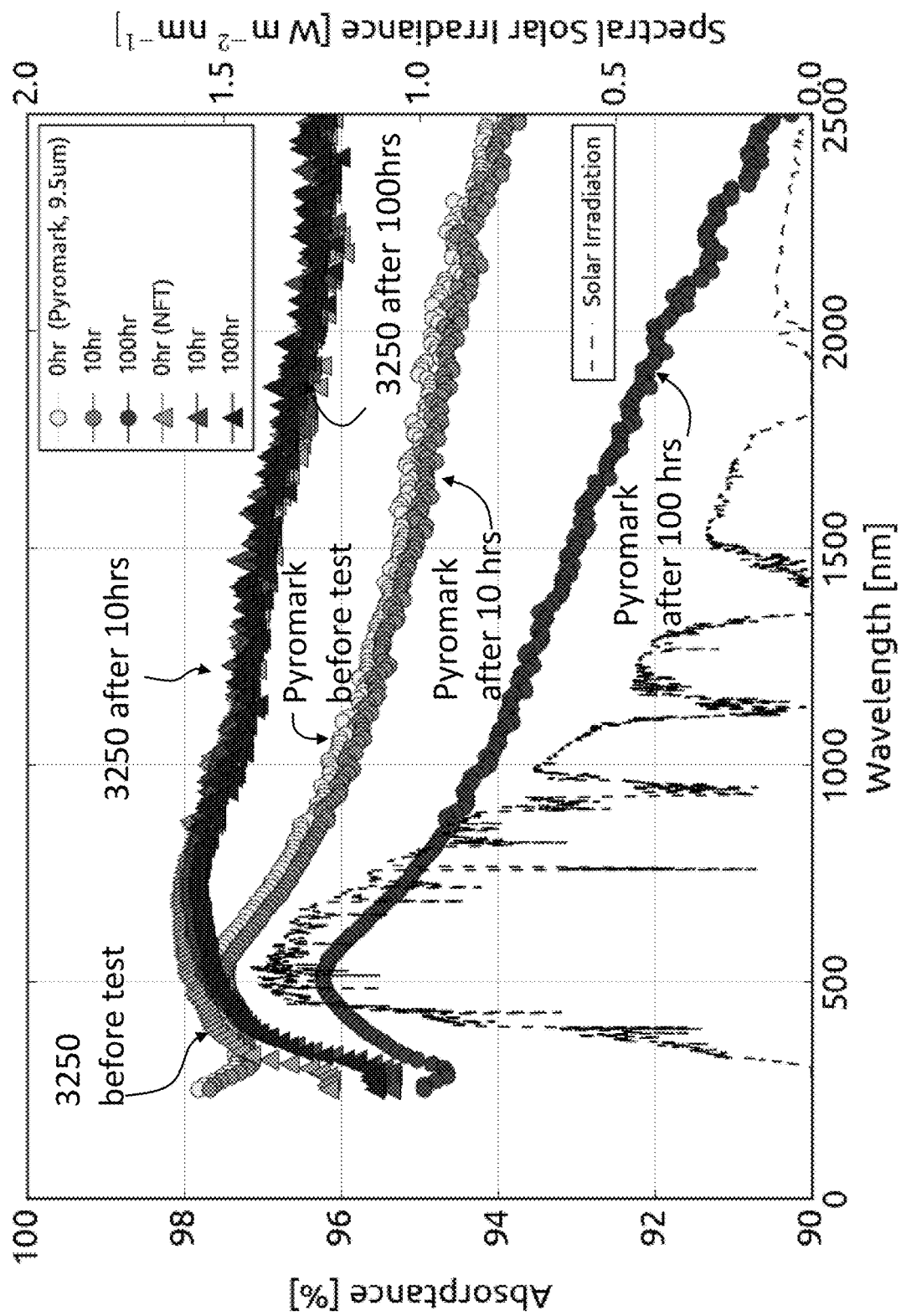
FIG. 25 shows the measurement results of the light absorptance before and after the heat resistance test at 750° C. for the membranes (samples 4 and 5) prepared in Example 32.

FIG. 25 shows the measurement results of the spectral absorptance before and after the thermal durability test at 750° C. for the three-layer coating (indicated as 3250 in the drawing) prepared in Example 32. A thermal durability test (10 hours and 100 hours (10+90 hours) at 750° C. was performed for Samples 5 and 4 by the same method as the 600° C. thermal durability test. Sample 4 was measured for spectral absorptance by adding 90 hours after 10 hours of thermal durability test. The solar-weighted absorptance was shown in Table 8. Although the measurement result was similar to 600° C., the spectral absorptance decrease after 100 hours compared with that before the durability test was lower than the test at 600° C. However, at 750° C., there was less drop in samples 4 and 5 than the control coating as shown in Table 8.

TABLE 8

| | Solar-weighted absorptance: α(%) (change from 0) | | |
|---|---|---|---|
| Time (hours) | Pyromark (thickness 9.25 μm) | 3250 (sample 5) | 3250 (sample 4) |
| 0 | 96.66 | 96.83 | 96.99 |
| 10 | 96.47 (−0.19) | 96.74 (−0.09) | 96.88 (−0.11) |
| 100 | 96.86 (−1.8) | — | 96.80 (−0.19) |

Figure 26:
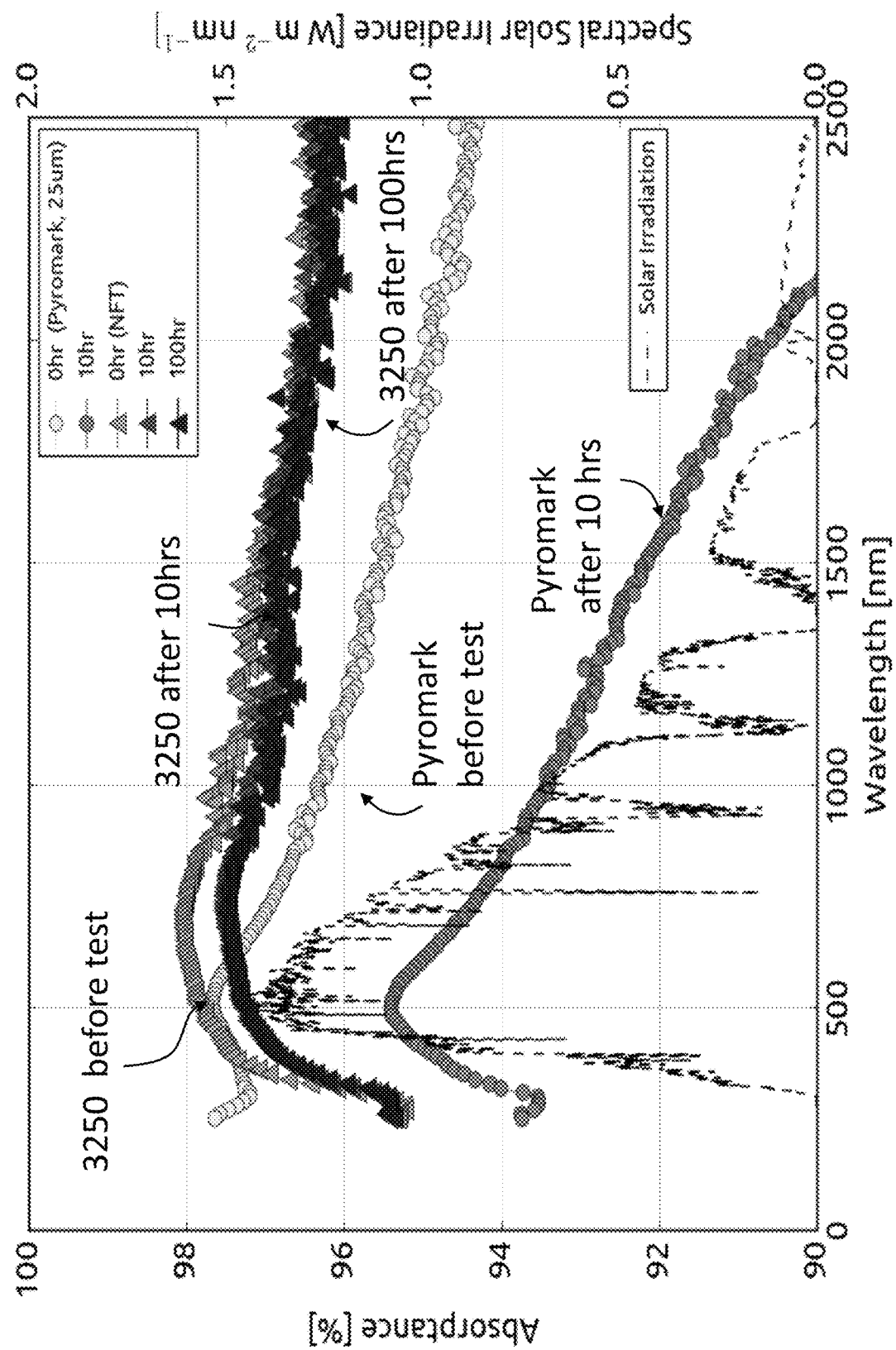
FIG. 26 shows the measurement results of the light absorptance before and after the heat resistance test at 850° C. for the membranes (samples 1, 2 and 3) prepared in Example 32.

FIG. 26 shows the measurement results of the spectral absorptance before and after the thermal durability test at 850° C. for the three-layer coating (indicated as 3250 in the drawing) prepared in Example 32. The thermal durability test was conducted for sample 3 for 10 hours, sample 1 for 20 hours and sample 2 for 100 hours. Sample 1 was initially conducted for 10 hours and an additional 10 hour-thermal durability test was performed. Sample 2 was subjected to a thermal durability test for 10 hours at the beginning and then for an additional 90 hours. The solar-weighted absorptance results were shown in Table 9.

TABLE 9

| | Solar-weighted absorptance: α(%) (change from 0) | | | |
|---|---|---|---|---|
| Time (hours) | Pyromark (thickness 25 μm) | 3250 (sample 3) | 3250 (sample 2) | 3250 (sample 1) |
| 0 | 96.77 | 96.94 | 96.91 | 96.96 |
| 10 | 94.02 (−2.75) | 96.72 (−0.23) | 96.49 (−0.42) | 96.54 (−0.42) |
| 20 | — | — | 96.42 (−0.49) | — |
| 100 | failure | — | — | 96.47 (−0.49) |

The results show the absorptances after the test were decreased as compared with 600° C. and 750° C. Particularly, the decrease was significant near 1500 nm. Interestingly, the solar-weighted absorptances did not decrease from 20 hours (−0.49%) to 100 hours (−0.50%). However, further long-term thermal durability test may be necessary to confirm this phenomenon. The rate of the decrease in the solar-weighted absorptance is much smaller than that of the control coating (96.77% before the test, 94.02% after the thermal durability test for 10 hours, i.e. −2.75% decrease). The measurement of the control coating after 100 hours was failure due to exfoliation of the coating. From these results, it was shown that the coating (3250) produced in Example 32 has not only high spectral absorptance but also high thermal durability as compared with the control coating.

INDUSTRIAL APPLICABILITY

The absorber coating for solar heat power generation according to the present invention can be utilized for concentration solar power generation.

The invention claimed is:

1. An absorber coating for solar heat power generation, the absorber coating comprising:
a network structure of composite particles, the network structure of the composite particles having:
metal oxide particles including mainly two or more metals selected from Mn, Cr, Cu, Zr, Mo, Fe, Co, and Bi; and
titanium oxide partly or entirely coating an outer surface of each of the metal oxide particles,
wherein an arithmetic mean estimation of a surface of the absorber coating is 1.0 μm or more, and a ratio of a surface area of the network structure of the composite particles of the absorber coating to a plane area of the absorber coating is 7 or more.

2. The absorber coating for solar heat power generation according to claim 1,
wherein a spectral reflectance of the absorber coating at a visible light region of a wave length from 400 to 700 nm is less than 5.0%.

3. The absorber coating for solar heat power generation according to claim 1,
wherein the metal oxide particles include mainly two or more metals selected from Cr, Mn, and Cu.

4. The absorber coating for solar heat power generation according to claim 3,
wherein a spectral reflectance of the absorber coating at a visible light region of a wave length from 400 to 700 nm is less than 5.0%.

5. The absorber coating for solar heat power generation according to claim 1, the absorber coating further comprising:
a porous silica coating on the network structure of the composite particles.

6. The absorber coating for solar heat power generation according to claim 5,
wherein a spectral reflectance of a combination of the porous silica coating and the network structure of the composite particles at a visible light region of a wave length from 400 to 700 nm is less than 5.0%.

7. A process for producing the absorber coating for solar heat power generation according to claim 1, the process comprising:
a first mixing step of mixing titanium alkoxide (A) and at least one of acetylacetone and ethyl acetoacetate (B) in a molar ratio of A:B=1:1 or more;
a second mixing step of mixing the metal oxide particles including mainly two or more metals selected from Mn, Cr, Cu, Zr, Mo, Fe, Co, and Bi, in the mixture formed in the first mixing step; and
a coating step of supplying the mixture formed in the second mixing step on a substrate to form the absorber coating.

8. The process for producing the absorber coating for solar heat power generation according to claim 7,
wherein a spectral reflectance of the absorber coating at a visible light region of a wave length from 400 to 700 nm is less than 5.0%.

9. The process for producing the absorber coating for solar heat power generation according to claim 7,
wherein, in the coating step, the mixture formed in the second mixing step is sprayed on the substrate heated at 250 to 400° C.

10. The process for producing the absorber coating for solar heat power generation according to claim 9, wherein a spectral reflectance of the absorber coating at a visible light region of a wave length from 400 to 700 nm is less than 5.0%.

11. The process for producing the absorber coating for solar heat power generation according to claim 7,
wherein the coating step includes:
a spraying step of spraying the mixture formed in the second mixing step on the substrate at a temperature of less than 250° C.; and
a heating step of heating the sprayed mixture on the substrate at 250 to 400° C.

12. The process for producing the absorber coating for solar heat power generation according to claim 11,
wherein a spectral reflectance of the absorber coating at a visible light region of a wave length from 400 to 700 nm is less than 5.0%.

13. The process for producing the absorber coating for solar heat power generation according to claim 7,
wherein the metal oxide particles include mainly two or more metals selected from Cr, Mn, and Cu.

14. The process for producing the absorber coating for solar heat power generation according to claim 13,
wherein a spectral reflectance of the absorber coating at a visible light region of a wave length from 400 to 700 nm is less than 5.0%.

15. The process for producing the absorber coating for solar heat power generation, according to claim 7, the process further comprising:
a silica coating step of forming a porous silica coating on the network structure of the composite particles.

16. The process for producing the absorber coating for solar heat power generation according to claim 15,
wherein a spectral reflectance of a combination of the porous silica coating and the network structure of the composite particles at a visible light region of a wave length from 400 to 700 nm is less than 5.0%.

* * * * *